United States Patent

Kawabe et al.

Patent Number: 6,034,710
Date of Patent: Mar. 7, 2000

[54] IMAGE FORMING METHOD FOR SILVER HALIDE PHOTOGRAPHIC MATERIAL

[75] Inventors: Toru Kawabe; Tuyosi Hattori; Takashi Igarashi; Ken Okauchi; Masao Inui; Tsuyoshi Haraguchi; Yutaka Takei, all of Hino, Japan

[73] Assignee: Konica Corporation, Tokyo, Japan

[21] Appl. No.: 08/747,837

[22] Filed: Nov. 13, 1996

Related U.S. Application Data

[63] Continuation-in-part of application No. 08/558,850, Nov. 15, 1995.

[30] Foreign Application Priority Data

Nov. 16, 1994 [JP] Japan .................................. 6-281903
Nov. 14, 1995 [JP] Japan .................................. 7-295520

[51] Int. Cl.[7] ...................................................... B41J 2/36
[52] U.S. Cl. ........................................................... 347/236
[58] Field of Search .................................. 347/236, 240, 347/237, 233; 250/208.2

[56] References Cited

U.S. PATENT DOCUMENTS

| | | | |
|---|---|---|---|
| 4,074,320 | 2/1978 | Kapes, Jr. ............................... | 358/302 |
| 4,455,578 | 6/1984 | Fearnside . | |
| 4,525,729 | 6/1985 | Agulnek et al. . | |
| 4,596,995 | 6/1986 | Yamakawa et al. . | |
| 4,706,130 | 11/1987 | Yamakawa . | |
| 4,750,010 | 6/1988 | Ayers et al. . | |
| 4,757,327 | 7/1988 | Henzi . | |
| 4,763,142 | 8/1988 | Saitoh et al. .............................. | 347/136 |
| 4,821,113 | 4/1989 | McQuade et al. . | |
| 4,827,279 | 5/1989 | Lubinsky et al. . | |
| 4,897,639 | 1/1990 | Kanayama . | |
| 4,897,672 | 1/1990 | Horiuchi et al. ......................... | 347/236 |
| 4,905,027 | 2/1990 | Itoh ......................................... | 347/237 |
| 4,998,118 | 3/1991 | Ng . | |
| 5,105,281 | 4/1992 | Kusaka . | |
| 5,160,837 | 11/1992 | Hirane et al. ......................... | 250/208.2 |
| 5,235,175 | 8/1993 | Mayer .................................. | 347/237 X |
| 5,345,315 | 9/1994 | Shalit ..................................... | 358/406 |

FOREIGN PATENT DOCUMENTS

| | | |
|---|---|---|
| 0 297 603 | 1/1989 | European Pat. Off. . |
| 0 424 174 | 4/1991 | European Pat. Off. . |
| 5-016429 | 1/1993 | Japan ............................... B41J 2/445 |

Primary Examiner—N. Le
Assistant Examiner—Anh T. N. Vo
Attorney, Agent, or Firm—Finnegan, Henderson, Farabow, Garrett & Dunner, L.L.P.

[57] ABSTRACT

A apparatus for forming an image on a silver halide photosensitive material with a plurality of recording elements aligned in the form of at least a single line, each recording element is driven so as to conduct an On-Off exposure independently to obtain a light amount datum in accordance with a density of a image signal, a correction value is calculated from the light amount datum and a light amount of each recording element is corrected with the correction value.

24 Claims, 19 Drawing Sheets

TO DEVELOPING PROCESS a   ALIGNING DIRECTION EXPOSURE SIZE
b   ALIGNING DIRECTION RECORDING PITCH
A   SCANNING DIRECTION EXPOSURE SIZE
B   SCANNING DIRECTION RECORDING PITCH

PIXE No.

PIXE No.

TO DEVELOPING PROCESS

TO DEVELOPING PROCESS

IMAGE FORMING METHOD FOR SILVER HALIDE PHOTOGRAPHIC MATERIAL

This is a Continuation-In-Part application of Ser. No. 08/558,850 filed Nov. 15, 1995 which is hereby incorporated in its entirety by this reference.

BACKGROUND OF THE INVENTION

The present invention relates to an image forming method by which a continuous gradation recording is conducted on a silver halide photographic material.

Conventionally, the importance of gradation is well known in order to reproduce a high quality image. Stating gradation more concretely, the continuity in continuous gradation, in particular, the reproduction of low density gradation in portions in which the density is almost uniform, such as the moderate gradation in the contrast in the skin of an enlarged human figure or in the sky is very important. In order to realize good gradation in a digital image, gradation control higher than at least 200 levels is requested. On the other hand, a technique to record a continuous gradation image with an array light source is well known. The array light source makes it possible to conduct image formation at high speed and at low cost with a small sized apparatus.

For example, the following methods are well known.

(1) A first method such as the Dither method with which a multi-gradation image is depicted in the pseudo sense by combining a plurality of binary pixels.

(2) A second method with which the light intensity or the light emission time period per one time of each element in the array light source is changed independently in accordance with the gradation level. However, since the first method is a pseudo-depiction method in which the image resolution is sacrificed, it may be difficult to expect high resolution recording. With the second method, a D/A converter and a comparator are needed for each recording element, resulting in a driver circuit for the recording elements which becomes complicated and expensive.

Then, a third method with which a multi-level recording is conducted by plural time exposures with the use of a binary or multi-level array light source may be considered.

However, with the third method, good gradation may be obtained without degrading the resolution and without causing the apparatus to become complicated and expensive. On the other hand, in the condition that the gradation is enhanced, there may be a problem that density unevenness caused by the deviation among the light emission characteristics of each recording element becomes conspicuous.

To overcome this problem, the following correction may be considered. That is, the recording elements are controlled sequentially one by one to emit light and the emitted light intensity of each element is measured, the correction value for the deviation among the light emission characteristics of each recording element is obtained on the basis of the measurement, and the correction is conducted on the basis of the correction value. For example, in the method disclosed in WO90/09890, since recording is conducted on a recording medium of a high contrast gradation characteristics, the gradation depiction is conducted basically only by area modulation, it may be difficult to obtain a sufficiently continuous gradation image. To counter this problem, a technique to improve the gradation continuity with the use of a line-formed light source element with which the recording width per one line is made small may be considered. However, on the other hand, it is difficult to obtain the maximum density due to the deficiency of the light amount, resulting in another problem being raised. Further, in the case of the application on a silver halide photosensitive material of the low contrast recording medium, the recording mode shows the density modulation and the continuous gradation is enhanced. However, since the density unevenness may not be eliminated appropriately, there may another problem in that the unevenness on the portion in which the density is almost an equal density which is especially important for the reproduction of the gradation becomes conspicuous in comparison with a complicated image portion.

SUMMARY OF THE INVENTION

The present invention has been conceived in light of the above problems. An objective is to provide an apparatus with which a continuous gradation image can be recorded with a high resolution without causing the apparatus to become complicate and a high cost and a high quality image in which density unevenness is not conspicuous can be formed on a silver halide photosensitive material.

The above objective can be attained by the following methods and structures.

In Method 1, in an image forming method in which a plurality of recording elements (or exposing elements) which are aligned in the form of a single line or plural lines and can be driven On-Off independently are driven On-Off plural times by the combination of the same or different time periods in accordance with image data so that exposure is conducted on a silver halide photosensitive material, light amount data are obtained for each recording element on the condition that plural pieces of the recording elements are being driven, and a correction value for an exposure amount of each recording element is obtained on the basis of the light amount data.

In Structure 1, in an image forming apparatus in which a plurality of recording elements (exposing elements) which are aligned in the form of a single line or plural lines and can be driven On-Off independently are driven On-Off plural times by the combination of the same or different time periods in accordance with image data so that exposure is conducted on a silver halide photosensitive material, the apparatus comprises control means for obtaining light amount data for each recording element on the condition that plural pieces of the recording elements are being driven, for obtaining a correction value for an exposure amount of each recording element on the basis of the light amount data, and for correcting the recording elements on the basis of the correction value.

With Method 1 and Structure 1, on the condition that a plurality of recording elements are driven in which the condition is close to an actual image recording condition, a light amount is obtained and the correction is conducted, whereby the density unevenness caused by the deviation of the light emission characteristics of each recording element can be reduced, a high resolution continuous gradation image can be obtained and a high quality image can be formed, without resulting in a complicated apparatus on high cost in comparison with cases where a light amount is measured and the correction is conducted on condition that each element is controlled to emit light one by one and in which the condition is different from the actual image recording condition. Incidentally, the plurality of recording elements arranged in the array form includes a staggered arrangement.

In Method 2, in an image forming method in which a plurality of recording elements which are aligned in the form of a single line or plural lines and can be driven On-Off independently are driven On-Off a plural number of times by the combination of the same or different time periods in accordance with image data so that exposure is conducted on a silver halide photosensitive material, light amount data are obtained for each recording element on the condition that plural pieces of the same kind of recording elements of the recording element to be obtained the light amount are being driven, and a correction value for an exposure amount of each recording element is obtained on the basis of the light amount data. Further, in Structure 2, in an image forming apparatus in which a plurality of recording elements which are aligned in the form of a single line or plural lines and can be driven On-Off independently is driven On-Off a plural number of times by the combination of the same or different time periods in accordance with image data so that exposure is conducted on a silver halide photosensitive material, the apparatus comprises control means for obtaining light amount data for each recording element on the condition that plural pieces of the same kind of recording elements of the recording element to be obtained the light amount data are being driven, for obtaining a correction value for an exposure amount of each recording element on the basis of the light amount data, and for correcting the recording elements on the basis of the correction value.

With the above method and the structure, as shown in FIGS. 13(a) and 13(b), in the case of the same kind of recording element of the recording element which is used in the image formation, that is, in cases where the light emission characteristic pattern of each element are similar to each other, the correction amount can be obtained with the use of the same kind of recording element of the recording element which is used for the image formation. In the invention, the exposure of the silver halide photosensitive material is conducted on the condition that the plurality of recording elements are driven, and light amount data are obtained by measuring the density of the exposed photosensitive material.

With the above, since the correction value is calculated from the density measurement value, the density measurement values can be handled as light amount data on a condition equal to the condition that the recording elements are driven so as to actually output an image, and the correction value can be obtained in the end output form of the density including the influence of the multi-exposure effect by the plural time exposure and an intermittent exposure effect. Whereby a further better quality image without density unevenness can be obtained.

In the invention, the relationship between the density data and the light amount data is obtained so that the density data are converted into light amount data and the correction value of the exposure amount of each recording element is obtained.

With the above, the relationship between the density measurement value and the light amount in the total light emission time of the plural time exposures in which the exposure is conducted plural times is obtained and the density measurement value is converted into the light amount so that the correction value is obtained. By this measure, the discontinuity taking place during the plural time exposures in relationship between the emission time and the density can be corrected more precisely, the density unevenness caused by the influence of the discontinuity can be eliminated more precisely, and a far better image with less density unevenness can be obtained. Incidentally, herein, the discontinuity in the gradation means an irregularity which is caused by the responding characteristic of the light source and the photosensitive material during the plural time exposure. In particular, when the control with which the exposure is conducted on the basis of the correction value, the density is measured, and a correction value is obtained again is repeated, the consideration of the relationship between the light amount and the density is preferable, because the convergence ability is further enhanced.

In the invention, the plural pieces of the recording elements are driven simultaneously so as to emit light and the exposure amount is measured, whereby the light amount data are obtained.

With the above, since the light amount data are obtained directly, the control can be simplified. In addition, the measurement value measured on the condition becomes the data of the unevenness conspicuous portion on a similar condition of the light emitting condition in the actual image recording, the unevenness can be reduced so that a high quality image can be obtained.

In the invention, the correction value for the exposure amount of each recording element is obtained with the use of the light amount data and a single light amount which is obtained by measuring an exposure amount in the case that the recording elements are driven one by one so that only a single element emits a light.

With the above, by using the measurement value of a single element together, the small pitch density unevenness for each pixel can be reduced in addition to the unevenness of a large pitch, so that the high image quality can be obtained.

In the invention, the light amount data is obtained by measuring an exposure amount of each recording element on the condition that a plurality of recording elements are emitting light simultaneously.

With the above, since light measurement for a single element is conducted directly on the condition that plural recording elements are emitting light, a correction value can be calculated far more precisely, so that a high quality image can be obtained.

In the invention, an image is formed on the silver halide photosensitive material in such a manner that the image data is stored for each line of the recording elements in the latch means, the enable signal which is converted into a combination of the same or different time widths in accordance with image data is generated by stages for every time the image data is latched by the latch means, each of the recording elements is driven respectively by the driving means on the basis of the enable signal generated by stages so as to conduct On-Off recording plural times in accordance with the time width of the enable signal.

With the above, the driving means conducts the On-Off recording plural times for the silver halide photosensitive material in accordance with the time period of the enable signal. Accordingly, a continuous gradation recording can be conducted so that a high quality image is obtained without causing the apparatus to be complicated or at high cost. In the invention, the driving means conducts the On-Off recording plural times in accordance with the time width of the enable signal so that the length of the total recording time period of each recording element set by the enable signal generated by stages by the enable signal generating means corresponds to the magnitude of the gradation of the image data. Then, the image is formed by a recording head composed of the recording elements which are used to control a plurality of color lights corresponding to the plurality of photosensitive layers differing in color-sensitivity of the silver halide color photosensitive material.

With the above, since the enable signal for each recording element can be set to conform with the sensitivity and gradation characteristics of each photosensitive layer of the silver halide color photosensitive material, a continuous gradation image with a high resolution can be recorded on the silver halide color photosensitive material with the utilization of the characteristics of the silver halide photosensitive material without causing the apparatus to be complicated or at a high cost.

Further, with the effect of the intermittent exposure effect which is a characteristic of the silver halide color photosensitive material, the difference between the high and low sensitivities becomes large and the color cross talk can be reduced so that the color separation can be improved. In addition, the spread of dots can be further extended so that the density of each dot region is unified. As a result, a continuous gradation recording can be conducted so that a high quality image can be obtained without causing the apparatus to be complicated and a high cost for the purpose of the positional registration for each color. Furthermore, degradation in the image quality such as Moire patterns caused by the positional deviation of each color hardly take place, a complicated and expensive apparatus necessary for the position registration of each color are not needed in the above structure.

In the invention, the recording head is composed of an LED array, a vacuum fluorescent tube array or a liquid crystal shutter array. With the above, since the plurality of recording elements arranged in an array form of a single line or plural lines are composed of the LED array, the vacuum fluorescent tube array or the liquid shutter array, the discontinuity of the gradation can be reduced.

In the invention, the recording elements conduct an exposure for color photographic printing paper of a silver chloride photosensitive material so that an image is formed. Herein, the silver chloride photosensitive material is defined as a photosensitive material comprising a silver halide emulsion layer containing not less than 90 mol % silver chloride. The silver chloride photosensitive material tends to cause the density unevenness greatly due to the influence of the multi-exposure effect by the plural time exposures or the intermittent exposure effect.

However, with the above, since the density unevenness is improved appreciably, the effect of the present invention for the silver chloride photosensitivity material is greater and the developing process can be conducted at a high speed.

In the invention, in the time that each time width of the enable signal generated by stages is converted into a multivalued digital value in accordance with the gradation of the image data, the driving means changes each time width sequentially in accordance with the weight in each bit in the time that the digital value is represented in binary numbers and drives each recording element individually so as to conduct On-Off recording.

With the above, the enable signal corresponding to the density value of the image data can be set without causing the apparatus to be complicated and a high cost. In the invention, the driving means drives each recording element individually so as to conduct On-Off record with each time width of $2^n T+t$ of the enable signal, wherein "n" is either 0, 1, 2, . . . which is a bit number in the time that each time width of the enable signal is converted in a digital value in accordance with the gradation of image data, "T" is a unit of time, "t" is a negative or positive value of a predetermined time.

With the above, since the time period of the enable signal can be adjusted respectively by increasing or decreasing "t", a smoother gradation recording can be conducted.

In the invention, each time width of the enable signal generated by stages is made constant, the driving means drives each recording element individually so as to conduct On-Off recording by the number of times of the value of the image data.

With the above method, the apparatus can be a simpler structure and similar gradation recording can be realized by a simpler structure.

In the invention, the enable signal generating means changeably sets the predetermined time width of the enable signal generated by stages.

With the above, since the time period of the enable signal can be finely adjusted, the gradation characteristics can be adjusted in accordance with the output characteristics of the apparatus.

In the invention, the plurality of recording elements are aligned in the array form of a single line or plural lines, the ratio of the exposure size of a single recording element in the aligned direction to the recording pitch in the aligned direction is 0.7 to 1.2. Herein, the exposure size does not means the size the formed image after the recording, and means the size of exposing optical image of a single recording element on the surface of the recording medium.

With the above, more continuous gradation characteristics can be obtained.

In the invention, the plurality of recording elements are aligned in the array form of a single line or plural lines, the ratio of the exposure size of a single recording element in the vertical direction with regard to the aligned direction to the recording pitch in the vertical direction with regard to the aligned direction is 0.3 to 1.0. With the above, more continuous gradation characteristics can be obtained.

In the invention, in the case that the plurality of recording elements are aligned in the array form of a single line or plural lines, the exposure size of a single recording element in the vertical direction with regard to the aligned direction is defined as "A", the recording pitch in the vertical direction with regard to the aligned direction is defined as "B", and the ratio of the time period from the start of light emission to the completion of light emission for a single line to the recording time cycle for the single line is defined as "C", the recording is conducted so as to satisfy the following formula:

$$0.8 \leq (A/B+C) \leq 1.3$$

With the above, more continuous gradation characteristics can be obtained.

In the invention, in the time of the gradation recording conducted by stages, an interval time period between each enable signal in which the enable signal is in a rest condition is set more than 2 micro-seconds and then the recording is conducted. With above, since the influence of the light emission history may be reduced by the just-before enable signal, it becomes possible to control the gradation characteristics with the time width of the enable signal. Especially, in cases where the exposure is conducted while moving, the spread of dot is widened so that unevenness caused in the time of area modulation can be reduced.

In the invention, shift control means is provided for conducting shift control in such a manner that shifting and stopping of the silver halide color photosensitive material is repeated in the vertical direction with regard to the aligned direction of the recording elements, and the recording is conducted with the use of the exposure more than 50% of the time period from the start of light emission to the completion of light emission of the recording elements for a single line while the silver halide color photosensitive material is shifting on the basis of the shift control by the shift control means.

With the above, since the exposure is conducted while conducting the shifting, the density in the dot region can be unified and the responding ability in the gradation control can be improved.

In the present invention, further, by the structure equipped with a plurality of recording elements which are arranged in an array form of a singe line or plural lines and are controlled independently, means for correcting deviation in amount of light emission of each recording element on the basis of correction data, and exposure control means for conducting exposure in 512 levels or more on a silver halide light sensitive material by controlling the recording elements to conduct On-Off driving plural times with a combination of the same time width or different time widths in accordance with image data; it become possible to provide an apparatus with the following effects. A high quality image having no irregularities on an even image, in particular, such as a skin of a person or a sky in a background can be obtained without losing the highest density. The apparatus dose not become complicate or high cost. Further, the apparatus forms a continuous gradation image with high quality by utilizing a characteristics of the silver halide light sensitive material.

Incidentally, image data in the present invention means that data value corresponds to an image. For example, when original data of an image has gradations less than 512 levels, by converting the image data so as to become 512 levels or more, by correcting the image data and by conducting image formation with the image data, it becomes possible to obtain the remarkable effects of the present invention. When original data of an image is 512 or more, it may be possible to handle the original data as the image data without any change or to use the original data after conversion.

Further, by the structure that the gradation attained by a plurality of On-Off driving of the recording element is made 65536 levels or less, it become possible to provide an apparatus with the following effects. The apparatus can be more simplified at low cost without failing to form high quality image having no density irregularity. Further, the processing speed can be enhanced.

Furthermore, in the present invention, by the structure that the correction data to correct the recording element is calculated from an amount of light emissions which is obtained for each recording element on a condition that plural recording elements among recording elements or the same kinds of recording elements arranged in an array form are driven, since the correction is conducted on the basis of the result obtained from an amount of light emission of each recording element on a condition similar to an actual image recording in which plural recording elements are driven, deviation in light emitting characteristics is more precisely corrected in comparison with the case that the correction is conducted on the basis of an amount of light obtained by driving the recording elements one by one under the condition apart from the actual recording. As a result, a high quality image with less irregularity in density can be formed.

By the structure that the silver halide light sensitive material used in the present invention comprises a plurality of light sensitive layers differing in sensitive color and each recording element arranged in an array form is controlled independently so as to conduct exposure with a color light among a plurality of color light corresponding to the plurality of light sensitive layers and at least the gradation of an exposure of green color can be controlled in 512 levels or more, at least the green exposure can be controlled in the case that the silver halide light sensitive material is a color light sensitive so that the apparatus can be simplified at low cost, a processing is conducted at a high speed, density irregularities on a color image can be reduced, and a more high quality color image can be formed.

DETAILED DESCRIPTION OF THE PREFERRED EMBODIMENT

Figure 1:
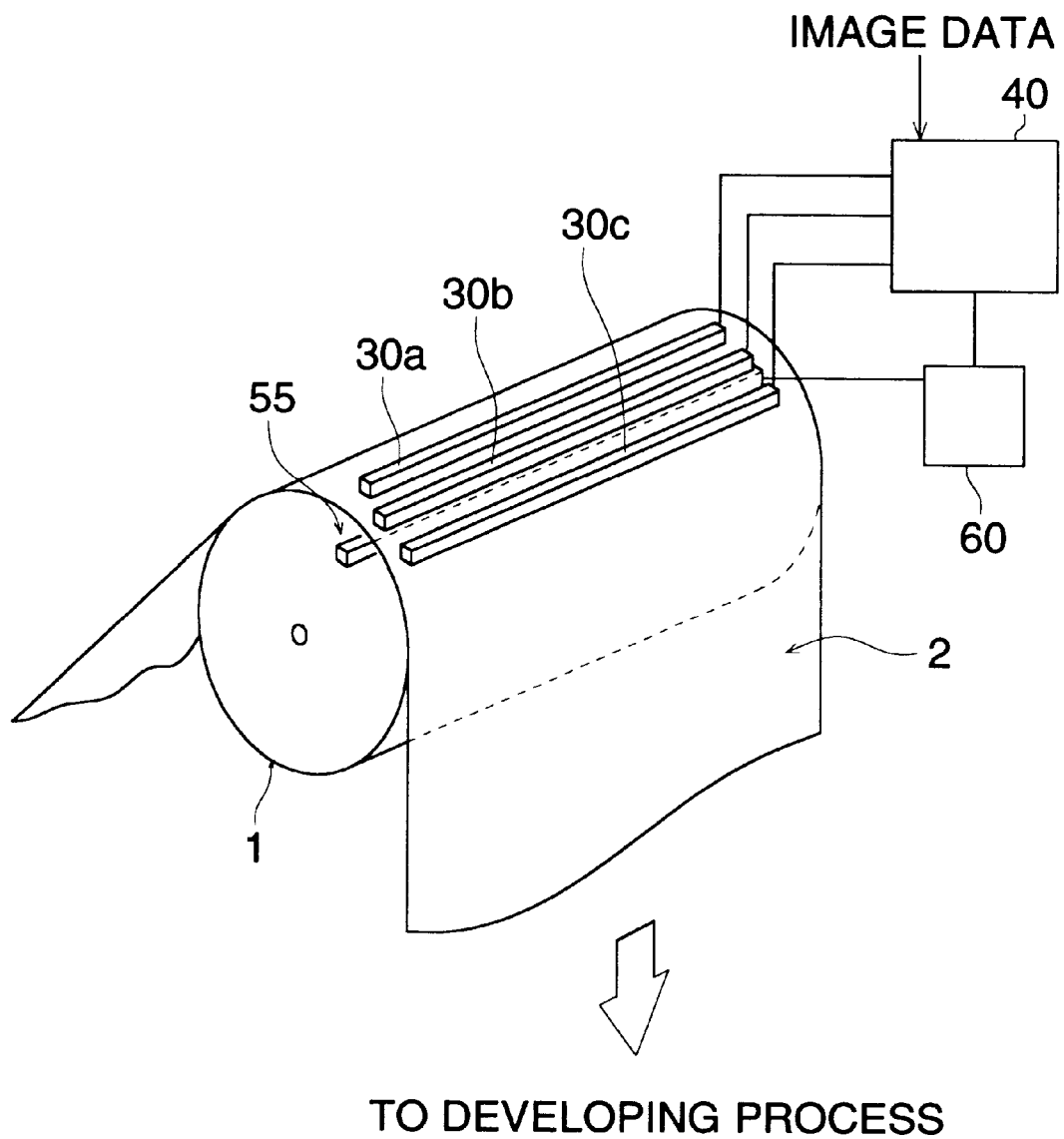
FIG. 1 is view showing an outline structure of an image forming method of one embodiment of the present invention.

Hereinafter, the embodiment of the present invention will be explained with reference to the drawings. The embodiment is only one example of the present invention, and the present invention is not limited to this embodiment. FIG. 1 is an outline view showing a structure of an image recording method. A color photographic printing paper 2 (hereinafter simply referred to printing paper) of a silver halide color photosensitive material is drawn out from a roll by a supporting drum 1 acting as a shift control means which is driven and rotated by an unillustrated conveyance driving source. When the printing paper 2 is conveyed in the arrowed direction, a red color light source printing head 30a, a green color light source printing head 30b and a blue color light source printing head 30c are subjected to an exposure control in accordance with image data by a printing head control section 40 so that required positions of the printing paper 2 are sequentially exposed for each color and a latent image of a color image is formed on the printing paper 2. After the exposure process has been completed in the above manner, the printing paper 2 is conveyed to a developing process by the supporting drum 1 in order to be subjected to the next process.

Incidentally, an array light source in which recording elements are arranged in a single line or plural lines is used for each printing head. For more detail, a LED light source which is generally used is adopted for the red color light source printing head 30, and a vacuum fluorescent printing head or Vacuum Fluorescent Print Head (hereinafter simply referred to VFPH) which is easily subjected to color separation by a color filter with a relatively high luminance and a high speed response is adopted for the green color light source printing head 30b and the blue color light source printing head 30c. As for the printing paper 2, it was explained as being in the form of a roll. However, the printing paper 2 may also be in the other form. Further, as for the shift means for the printing paper 2, the other conveying techniques may also be used.

A light receiving sensor 55 is disposed beneath the printing head through the supporting drum 1. Before the recording operation is conducted, the light receiving sensor 55 receives light from each of the printing heads 30a, 30b, 30c, converts the intensity of the light into an electronic signal with its internal photo-electric converting element, and then outputs the signal to the correction process section 60. Upon receipt of the signal, the correction process section 60 outputs correction data to correct the light emission characteristics of each of the printing heads 30a, 30b, 30c to the printing head control section 40. Based on the correction data, the printing head control section 40 regulates the light emission characteristic of each of the printing heads 30a, 30b, 30c.

Figure 2:
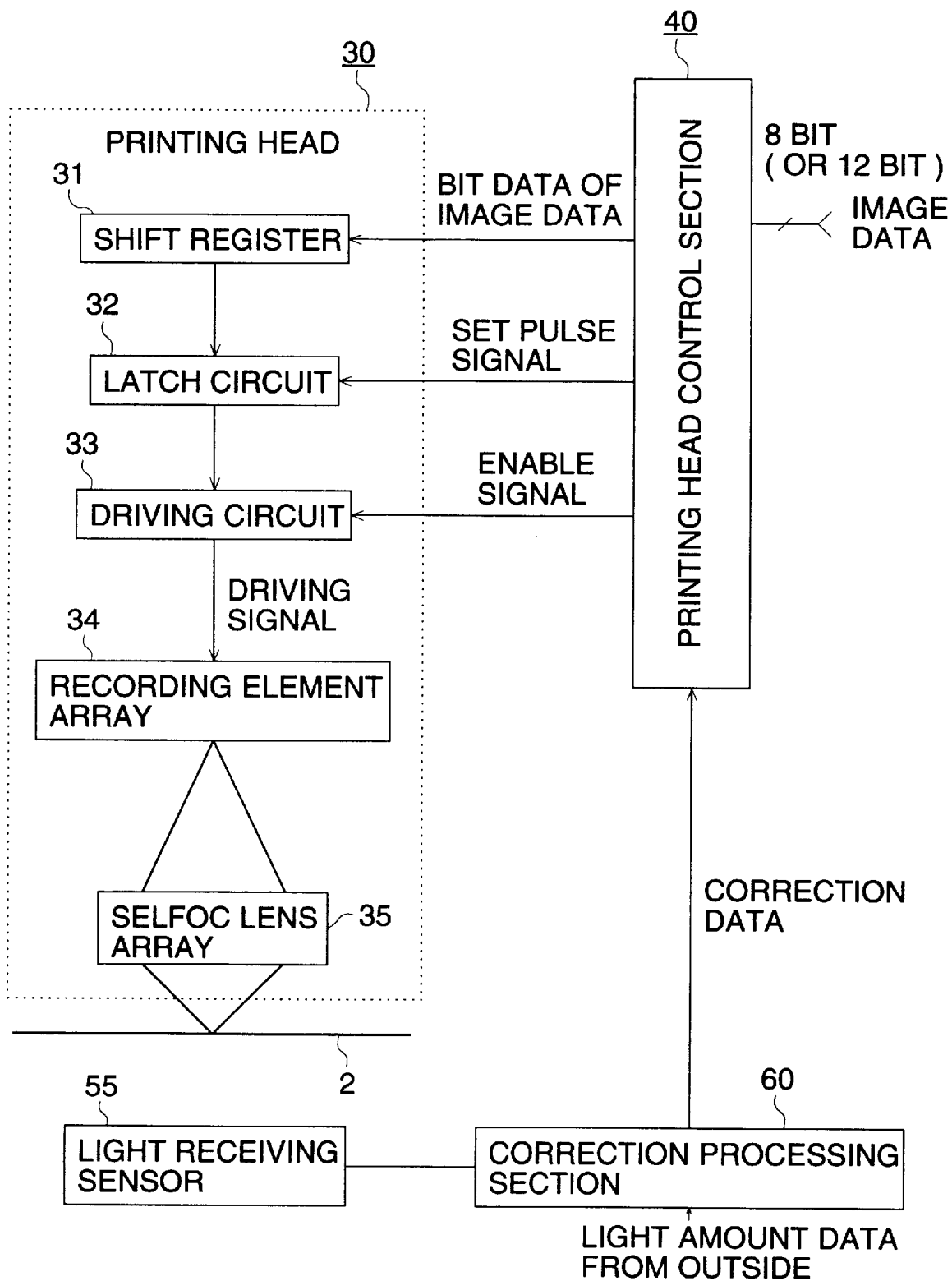
FIG. 2 is a view explaining an operation of writing image data in a printing head of the embodiment of the present invention.

FIG. 2 is a diagram explaining a writing operation of the printing head in which image data for one color component are written.

In FIG. 2, when the printing head control section 40 receives image data showing the gradation of each color component with a digital value of 8 bits or 12 bits, the printing head control section 40 conducts the correction process for the image data on the basis of the above correction data, converts the image data into serial digital image data corresponding in amount to one line of pixels for each recording element, generates a set pulse signal to transport bit data of the image data to a latch circuit 32 and an enable signal to control the light emitting time, and outputs to the printing head 30 for one color. The bit data of the image data means data as to a specific bit of the image data.

Initially, when data of MSB (Most Significant Bit) as the bit data of the image data corresponding in amount to one line is transmitted from the printing head control section 40 to a shift register 31 in the printing head 30, a set pulse signal is inputted in the latch circuit 32, and the data of MSB corresponding in amount to one line are latched together in synchronization with the set pulse signal.

Then, the enable signal corresponding to the gradation is inputted into a driver circuit 33, during a time period defined by the enable signal, each recording element in the recording elements which are arranged in an array form of one line or plural lines is controlled and driven so as to emit light in accordance with the latched image data. In other words, the driver circuit 33 selectively sends an enable signal to the recording elements in the recording array 34 whose latched data is "1", and causes the elements to emit light during the time period defined by the enable signal. The emitted light is focused on the printing paper 2 through a Selfoc lens array 35 and forms a latent image. In this manner, the operation is conducted sequentially for all of the 8 bits from MSB to LSB (Least Significant Bit), thereby the recording for one line is completed. Incidentally, the operation for one color was explained above, the operation for three colors is conducted in the same way of the above operation. Incidentally, the operation order for bits may be conducted from LSB to MSB or in the other order. The operation order is not limited to the above example.

VFPH which has the light emission characteristic for green component and blue component is provided with an unillustrated color separation filter for each of green and blue beneath the Selfoc lens array 35. Since the printing head control section 40 conducts the recording control in such a manner that exposure timing of each of the three sets of printing heads is delayed one after another so as to record image data transmitted for each color on the required position on the conveyed printing paper 2, the color image can be recorded properly. A yellow filter may be used as the filter for a green light source instead of a green filter. The printing head control section 40 conducts the recording control for the printing head 30 so that 50% or more of the recording amount of one line is conducted while the printing paper 2 is shifting by the supporting drum 1, whereby the recorded image is continued between lines. As a result, the occurrence of uneven images can be avoided and smooth continuous gradation can be attained by the density modulation.

Incidentally, the LED array and VFPH are adopted in the present embodiment. However, instead of them, a combination of light emitting member and a shutter array (liquid crystal shutter array, PLZT shutter array, etc.), a laser array (LD laser array, etc.) in which lasers are aligned, may also be used in a proper combination. Further, as photosensitive material used for the exposure process, the photographic color printing paper 2 including silver chloride was used. However, if the silver halide photosensitive material is a so called low contrast recording medium with which an image density can be controlled by the area modulation, such the low contrast recording medium may be used in the present embodiment. Also, if an array suits the color sensitivity of the photosensitive material, the array may be used in the present embodiment. In the case of the color recording, a three color control in which light sources for three colors are arranged on a single printing head may also be conducted.

An LED array made of a material such as GaAlAs or GaAsP is a high light emission efficiency element in comparison with the other LED array. Specifically, an LED array which has a sharp peak in the 650 nm to 680 nm range of the emitting wavelength can selectively expose the red light sensitive layer of the silver halide photosensitive material with high efficiency. Further, since it may be possible to conduct On-Off control at high speed on the order of several nano seconds, the LED array especially suits severe exposure time control.

In VFPH using oxidized zinc phosphor (ZnO:Zn), since light emission is caused in a wide spectral region extending from blue light to green light, a blue sensitive layer and a green sensitive layer of the silver halide color photosensitive material can be selectively exposed with the combination of VFPH and a color filter. Further, since the light emission efficiency is relatively high and temperature change during light emission is small, the shift of the peak wavelength of the emitting light caused by the temperature change is small and the exposure efficiency for the silver halide photosensitive material which has a high wavelength selecting tendency becomes stable.

In cases where a combination of a liquid crystal shutter and a light emitting member are used as the recording elements 34, since a possibility to make the array in a two dimensional form is high, the combination is particularly suitable for the purposes of conducting recording at a higher speed and recording the image in a larger size. Further, in cases where making two dimensional forms, it is possible to not make the total outputting speed of the image slow even if the exposure time for each element is made relatively long, and a discontinuing tendency in the gradation caused by plural times of exposure is small so that a good gradation can be obtained. Still further, since LED arrays, VFPH, a ferroelectricity liquid crystal shutter has a high speed switching capability, a discontinuing tendency in the gradation caused by plural times of exposure is also small so that good gradation is obtained.

Figure 3:
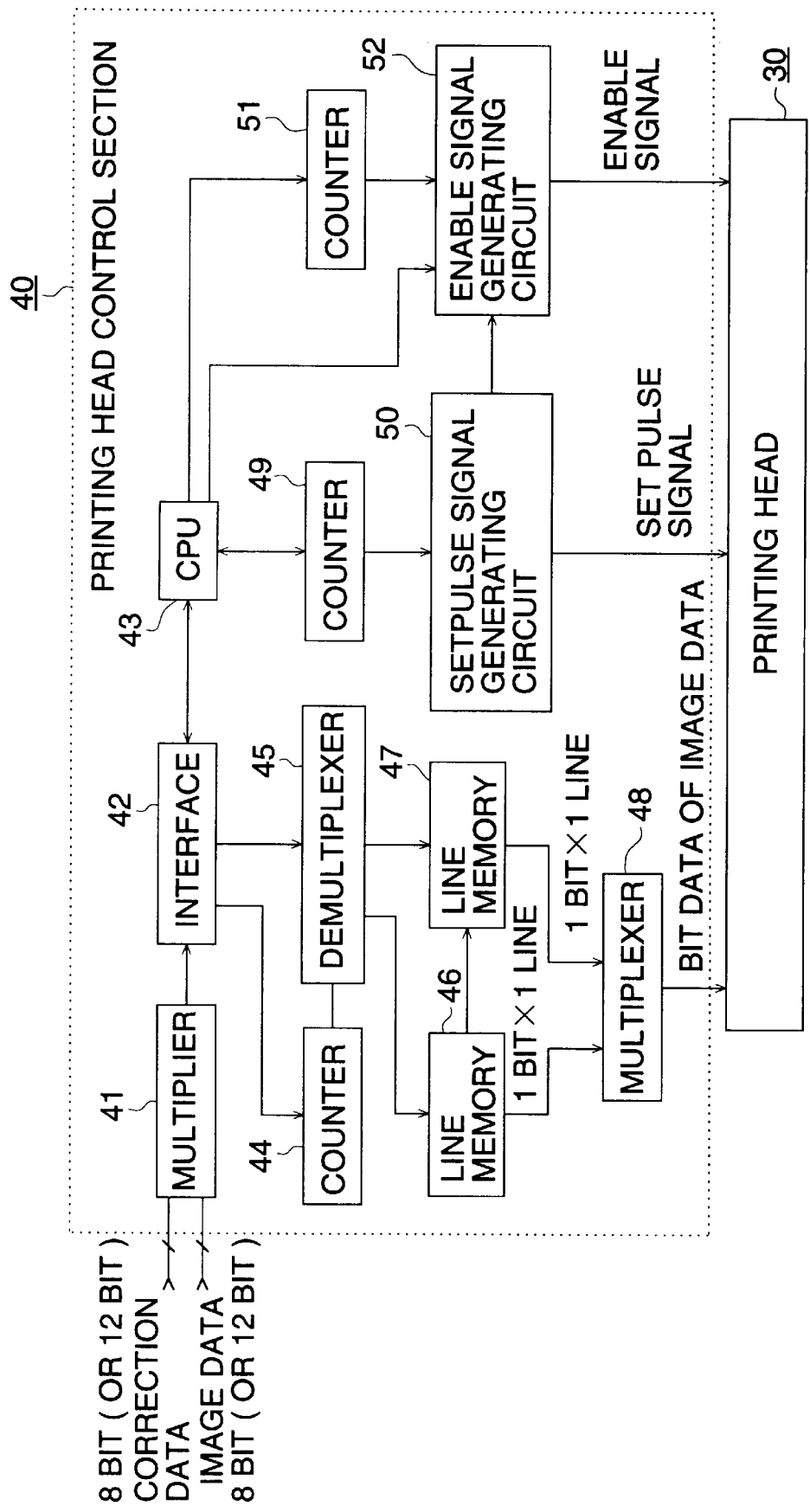
FIG. 3 is a detailed block diagram of a printing head control section of the embodiment of the present invention.

When the present embodiment is applied to a photosensitive material having a soft gradation characteristic, such as a silver halide photosensitive material, the highest efficiency can be obtained, and a real density modulated image can be obtained by the density control in a small region by the effect of the light emitting time control so that a smooth pictorial image quality can be obtained. FIG. 3 shows a detailed block diagram of the printing head control section 40. Its operation will be explained as follows.

Firstly, a multiplier 41 multiplies the image data by the correction data in order to conduct the correction of the light emitting characteristic obtained in the correction process section 60 as mentioned above, then the corrected image data is outputted to an interface 42. CPU 43 sets an initial count value to count pixels corresponding to one line in counter 44 through the interface 42 so that the counter 44 is started, and controls the demultiplexer 45 for changing the input. Upon receipt of this operation, counter 44 starts counting and outputs the count value to demultiplexer 45. Then, on the basis of the above count value, the image data (8 bits or 12 bits×one line) are written in a line memory 46.

When the writing operation to write the image data of the first line in the line memory has been completed, the bit data of the image data of the first line are outputted sequentially from MSB to LSB from the line memory 46 to the multiplexer 48, and then transmitted to the printing head 30. On the other hand, the output passage for the image data of the second line is changed by the demultiplexer 45 so that the image data of the second line are written in the line memory 47. In such a manner, during the time period that the bit data of the image data of the current line is transmitted to the printing head 30, the image data of the next line is subjected to the writing operation so as to be written into a line memory other than the line memory in which the image data of the current memory is written. Since such an expansion process and writing operation are repeated, the image data of each line are continuously outputted without delays in time.

Counter 49 counts the time to transmit the bit data of the image data to the multiplexer 48 under the control of the CPU 43 and outputs a count-up signal to a set pulse signal generating circuit 50. When the transmitting operation to transmit the bit data of the image data to the printing head 30 has been completed, the set pulse signal generating circuit 50 generates a set pulse signal and outputs it to the printing head 30, and also outputs the set pulse signal to the enable signal generating circuit 52.

On the other hand, the counter 51 counts an enable time corresponding to the density value assigned in advance for each bit of 8 bits or 12 bits under the control of the CPU 43 and outputs the enable signal generating circuit 52. Then, the enable signal generating circuit 52 generates an enable signal having an enable time corresponding to MSB of 8 bits or 12 bits representing the density value upon receipt of the generation of the set pulse signal and outputs it to the printing head 30 and to the CPU 43. Upon receipt of it, the CPU 43 controls the counter 49 so as to generate the next set pulse signal. By repeating such successive operations, the set pulse signal, the enable signal and the bit data of the image data are sequentially outputted from MSB to LSB for each line with a timing relating to each other to the printing head 30.

Figure 4:
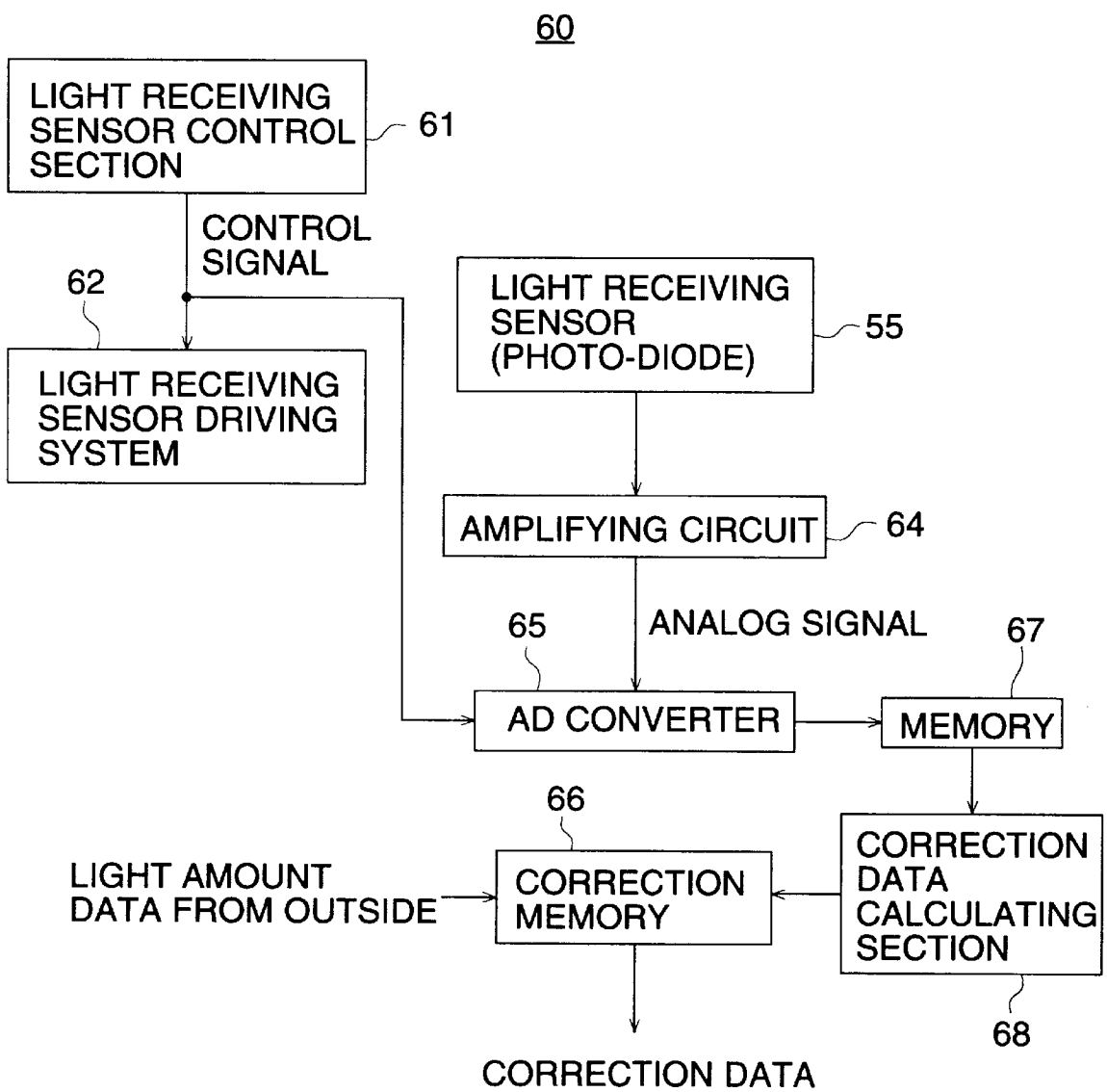
FIG. 4 is an outline block diagram of a correction data processing section of the embodiment of the present invention.

FIG. 4 shows a detailed block diagram of the correction data processing section.

A light receiving sensor driving system 62 conducts a light receiving control for a light receiving sensor 55 under the control of a light receiving sensor control section 61. That is, before the recording on the printing paper 2 is started, the light receiving sensor 55 is shifted to the image forming position of each of the three printing heads provided for each color, and conducts the light receiving operation. At this time, the supporting drum 1 is provided with a slit of a small gap through which the light receiving sensor 55 conducts the reading. The light receiving sensor 55 receives the emitting light sequentially for each color through the slit.

Analog electronic signals outputted from the light receiving sensor 55 are amplified by the amplifying circuit 64. Then, the signals are converted into digital electric signals with an A/D converter and the digital electronic signals are stored in a memory 67. Next, an arithmetic process is applied as required so that the correction data are calculated and are inputted and stored in a look-up table in the correction memory 66. Alternatively, the correction data may be inputted from the outside the unit and stored in the look-up table in the correction memory 66. With the look-up table, the correction data corresponding to the intensity of the receiving light is outputted.

Figure 5:
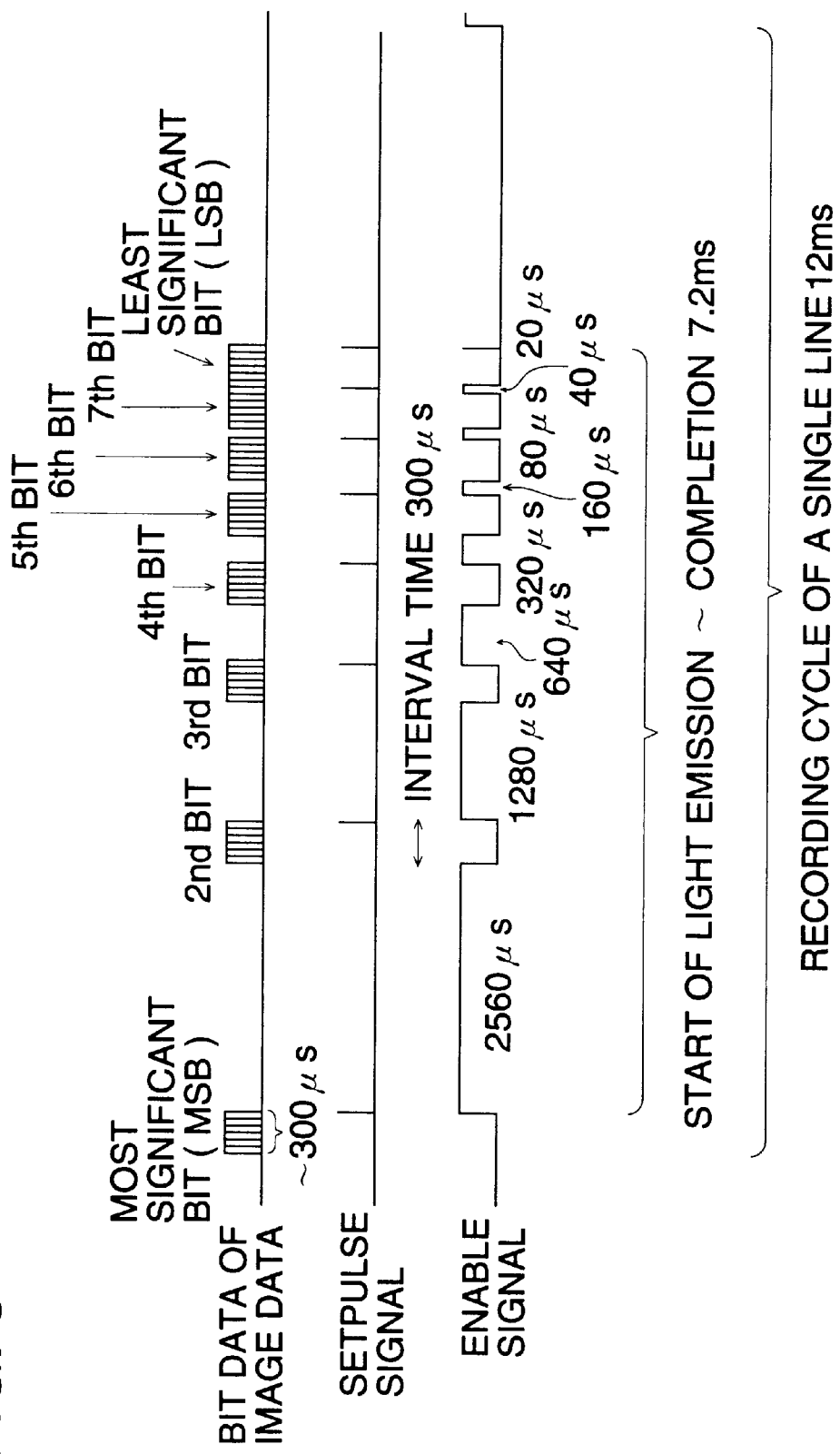
FIG. 5 is a timing chart of an output signal from the printing head control section of the embodiment of the present invention.

FIG. 5 shows a timing chart of the output signal outputted from the printing head control section 40 to the printing head 30b. Among the image data which has been subjected to an expansion process so as to form a density value structured in 8 bits for each pixel, firstly, MSB corresponding to one line are outputted over 300 $\mu$ sec and are transmitted to the printing head 30b, thereafter the set pulse signals and the enable signals are outputted. A time interval between the enable signals is set at 300 $\mu$ sec.

At this time, the time period of the enable signal of each color is as follows:

|     | B       | G       | R       |
| --- | ------- | ------- | ------- |
| MSB | 1536 μs | 2560 μs | 5120 μs |
| 2nd bit | 768 μs | 1280 μs | 2560 μs |
| 3rd bit | 384 μs | 640 μs | 1280 μs |
| 4th bit | 192 μs | 320 μs | 640 μs |
| 5th bit | 96 μs | 160 μs | 320 μs |
| 6th bit | 48 μs | 80 μs | 160 μs |
| 7th bit | 24 μs | 40 μs | 80 μs |
| LSB | 12 μs | 20 μs | 40 μs |

In this case, when the latch data or the bit values for all of the enable signals from MSB to LSB for an element are "1", the emitting light shows the highest density. The same control is conducted for the printing heads 30a and 30c.

Figure 14:
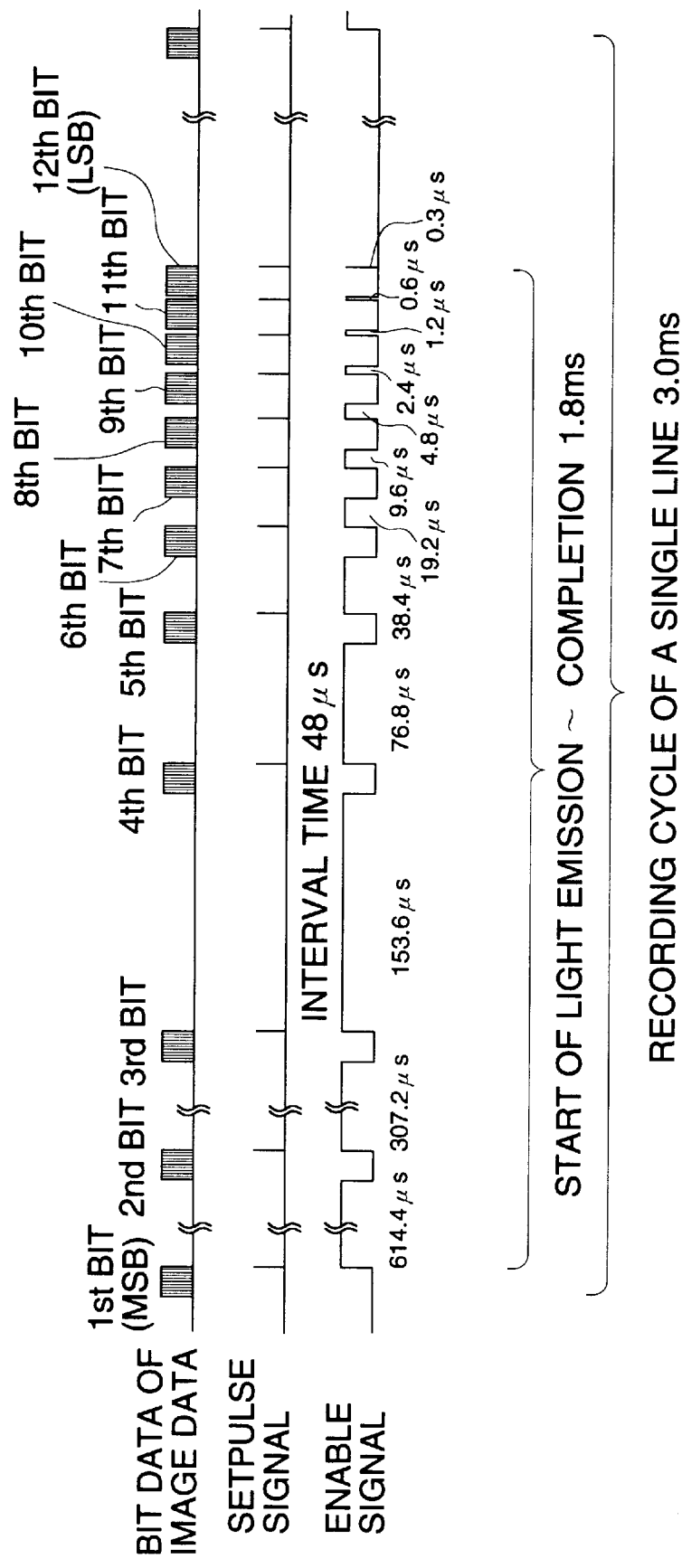
FIG. 14 is a timing chart of output signals outputted from a recording head control section to a recording head.
Figure 15:
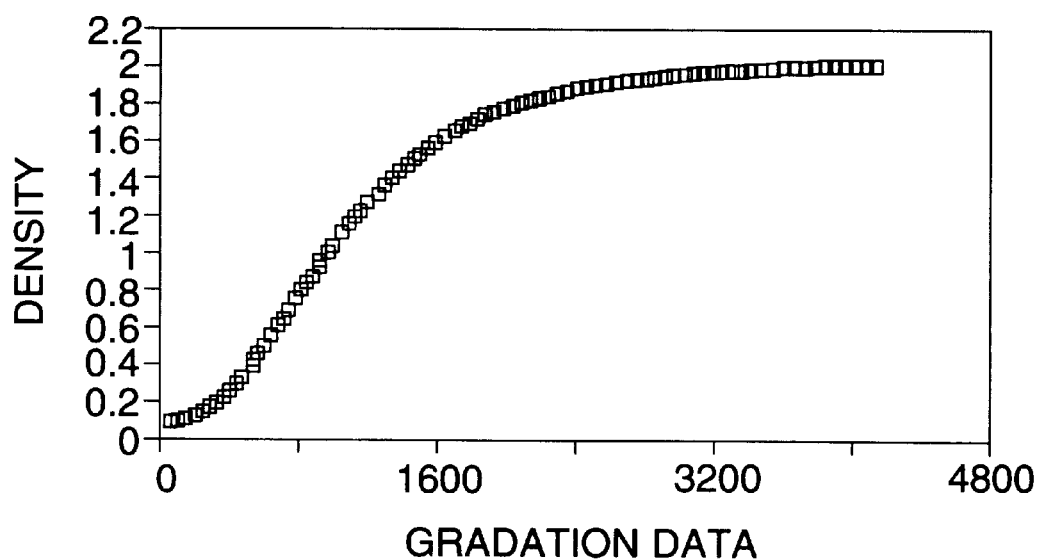
FIG. 15 is a graph showing a wedge density characteristics of magenta coloring by green exposure.

FIG. 14 is a timing chart of output signals in the case that image data of each pixel is extended into density value composed of 12 bits and an interval time between enable signals is set to 48 μsec.

At this time, time periods of enable signals for each color are as shown in table 1.

TABLE 1

| Bit | Red 30a (μsec) | Green 30b (μsec) | Blue 30c (μsec) |
| --- | --- | --- | --- |
| MSB | 204.8 | 614.4 | 614.4 |
| 2nd bit | 102.4 | 307.2 | 307.2 |
| 3rd bit | 51.2 | 153.6 | 153.6 |
| 4th bit | 25.6 | 76.8 | 76.8 |
| 5th bit | 12.8 | 38.4 | 38.4 |
| 6th bit | 6.4 | 19.2 | 19.2 |
| 7th bit | 3.2 | 9.6 | 9.6 |
| 8th bit | 1.6 | 4.8 | 4.8 |
| 9th bit | 0.8 | 2.4 | 2.4 |
| 10th bit | 0.4 | 1.2 | 1.2 |
| 11th bit | 0.2 | 0.6 | 0.6 |
| LSB | 0.1 | 0.3 | 0.3 |

In the above manner, since the enable signal for each bit of blue, green and red can be set to conform with the sensitivity and the gradation characteristics of each sensitive layer of the silver halide color photosensitive material, each recording element may be driven individually a plural number of times in the manner of On-Off recording, whereby a continuous gradation image with a high resolution can be recorded on a silver halide color photosensitive material with the utilization of the characteristic of the silver halide color photosensitive material without causing the apparatus to be complicated and at high cost.

The difference between the high sensitivity and the low sensitivity increases due to the intermittent exposure effect of the silver halide photosensitive material, resulting in that a color cross talk in exposure time can be decreased and the color separation can be enhanced. For example, speaking of the high density region of the color printing paper, since blue is slightly exposed by the green exposure, yellow is mixed in magenta after development, thereby causing the color cross talk with yellow. However, in the present invention, since On-Off exposure is conducted plural times, the color cross talk with yellow by the blue sensitive layer can be reduced, thereby obtaining a higher image quality.

Further, with the high contrast recording medium by the electrophotgraphy or a so-called silver developing technique such as a monochrome photosensitive material in a silver halide photosensitive material with which a silver image is formed, since the spreading of a pixel is small, the image is formed with the area modulation tendency, resulting in that an irregularity in a unit of a pixel is observed in the image and the obtained image is unacceptable. Further, since a pixel does not spread and its shape is distinct, the positional deviation among yellow, magenta and cyan pixels causes Moire patterns. Whereby, the image quality tends to be degraded. As a consequence, it is necessary to precisely register the position of the pixels for each color.

In contrast, in the present invention, with the so-called color developing method of forming a dye image by the development such as a silver halide color photosensitive material, the spread of a pixel is widened by plural On-Off exposure, the density in each pixel region tends to be unified, and the irregularity in unit of a pixel decreases, thereby obtaining a higher quality image. Further, since it is not necessary to use a complicated apparatus to conduct a high precision positioning, the cost does not increase. In this way, with the present embodiment, a continuous gradation recording with a higher resolution may be conducted with the utilization of the exposure characteristics of the printing paper 2 without causing a complicated apparatus and a high cost.

An example in which the image output was conducted with the present apparatus will be indicated hereinafter.

Inventive Example 1

The correction was conducted in the following procedure in the LED array which was the red light source printing head 30a and an image for the evaluation was outputted. Incidentally, the following two types of images were used as the image for the evaluation.

Image A: uniform density solid images classified into 5 stages of low density to middle density.

Image B: an image including a relatively large figure of a person on a background of gray gradation.

1) All recording elements were controlled to emit light on the basis of the image data with which the density value on the printing paper 2 was expected to be approximately 1.0, the printing paper 2 was exposed with the lights and developed so that images for the correction process were obtained.

2) The image density data were obtained in such a manner that the density measurement was conducted in a printing head 30a-aligned direction on the image for the correction process obtained by the above operation by a density measuring device (Konica Microdensitometer PDM-5 Type BR: manufactured by Konica Corporation).

Figure 11:
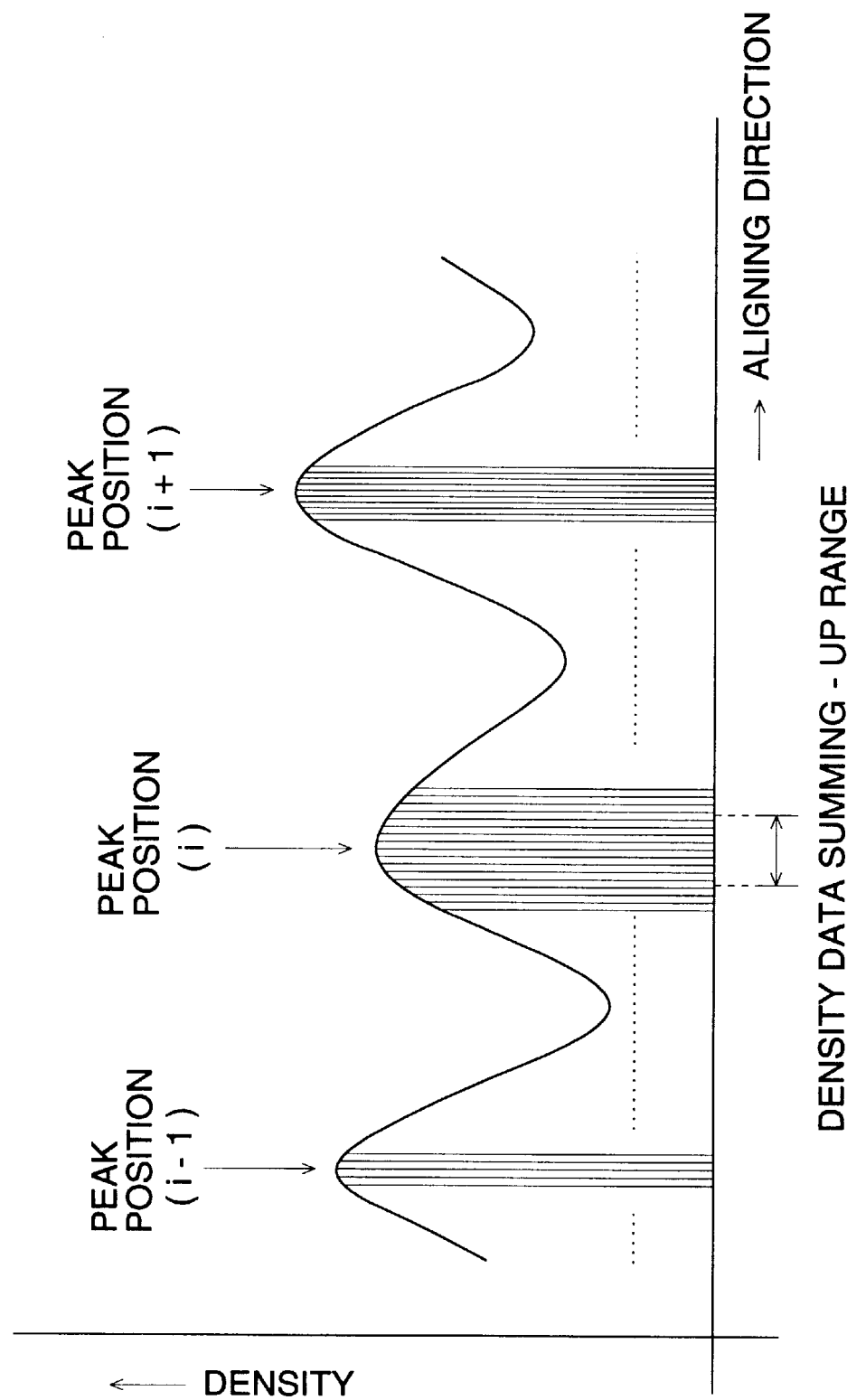
FIG. 11 is a diagram showing a peak point in the density data accumulating region.

3) FIG. 11 shows an example of the density data obtained in the above manner.

The density data became a form in which a peak was indicated for the position of each recording element. On the basis of this form, the density peak position (i) for each of all recording elements was detected.

4) Several data (5 data in this example) located before and after the peak point (i) obtained the above were summed up together with the peak density data so that the summed-up density data (Di) were calculated. The same calculation was conducted for all recording elements.

5) A correction value (Ci) was calculated from the density ratio of a reference summed-up density (Do: the average value of all summed-up density data) to the obtained summed-up density data (Di), and the correction value was stored in the correction memory 66.

$$Ci = Do/Di$$

6) The image data to be evaluated were multiplied with the correction data by the multiplier 41, and the printing paper 2 was exposed with the corrected image data.

7) The exposed printing paper was subjected to a predetermined developing process, whereby the image data to be evaluated was obtained.

Inventive Example 2

The correction was conducted with the following procedure in the LED array which was the red light source printing head 30a and an image for the evaluation was outputted. Incidentally, the image for the evaluation was the same as that in Inventive Example 1.

1) All recording elements were controlled to emit light on the basis of a plurality of the image data differing in density value, the printing paper 2 was exposed with the light and developed so that images for the correction process were obtained.

2) The density measurement was conducted in the same manner of Inventive Example 1 for the image for the correction process obtained by the above operation. As a result, a plurality of summed-up density differing in the image data value were obtained for each recording element.

3) A relationship between the image data value (proportional to the light amount of the recording element) and the density value was obtained for all recording elements. The image data value in the time of the specific target density (for example: density 1.0) was calculated as the light amount (Pi) from the above relationship.

4) A correction value (Ci) was calculated from the light amount ratio of a reference light amount (Po: the average value of all light amount) to the obtained light amount (Pi).

Ci=Po/Pi

5) The correction was conducted in the same manner as Inventive Example 1 on the basis of the obtained correction value (Ci), whereby the image data to be evaluated was obtained.

Comparative Example 1

The correction was conducted in the following procedure in the LED array which was the red light source printing head 30a and an image for the evaluation was outputted. Incidentally, the image for the evaluation was the same as that in Inventive Example 1.

1) On the condition that one recording element (i-th element) was emitting a light, the luminance (Ei) was measured by the light receiving sensor 55.

2) The above measurement was conducted sequentially for each element by the control of the light receiving sensor driving system 61 on the basis of the light receiving sensor control section 61.

3) A correction value (Ci) was calculated from the luminance ratio of the reference luminance (Eo) to the obtained luminance (Ei) in the correction data calculating section 68, and the correction value was stored in the correction memory 66.

Ci=Eo/Ei

4) The image data to be evaluated were multiplied with the correction data by the multiplier 41, and the printing paper 2 was exposed with the corrected image data.

5) The exposed printing paper was subjected to the predetermined developing process, whereby the image data to be evaluated was obtained.

Comparative Example 2

The correction was conducted in the following procedure in the LED array which was the red light source printing head 30a and an image for the evaluation was outputted. Incidentally, the image for the evaluation was the same as that for Inventive Example 1.

1) In the case that one recording element (i-th element) was controlled to emit a light with the specific image data value, the light was emitted plural times in accordance with the image data value as shown in the timing chart in the FIG. 5.

Under such conditions, the summed-up light amount (Ii) of all emitted lights was measured by the light receiving sensor 55.

2) The above measurement was conducted sequentially for each element by the control of the light receiving sensor driving system 61 on the basis of the light receiving sensor control section 61.

3) A correction value (Ci) was calculated from the luminance ratio of a reference light amount (Io) to the obtained light amount (Ei) in the correction data calculating section 68, and the correction value was stored in the correction memory 66.

Ci=Io/Ii (the average light amount of all measured elements was used as Io)

4) The correction was conducted in the same manner of Comparative Example 1 on the basis of the obtained correction value (Ci), whereby the image data to be evaluated was outputted.

For the obtained image, the visual evaluation was conducted in terms of the density unevenness for Image A and in terms of both the density unevenness and the gradation for Image B.

As a result, with regard to Image A to be evaluated, Inventive Example 1 showed less unevenness and a uniform image in terms of density in comparison with Comparative Example 1 and Comparative Example 2. Further, with regard to Image B, Inventive Example 1 showed a higher quality image which had less unevenness and better continuous gradation in gradation of the background and in the person's skin in comparison with Comparative Example 1 and Comparative Example 2.

With regard to Image A to be evaluated, Inventive Example 2 showed much less unevenness and a much more uniform image with an improvement in accuracy of the correction in comparison with Inventive Example 1. Further, with regard to Image B, Inventive Example 2 showed a higher quality image with much less unevenness and better continuous gradation in comparison with Inventive Example 1.

Inventive Example 3

In the case of formed image 1 in which a solid image was formed which has a uniform density in a predetermined area, and has a stepped-density, in which a time period from the minimum exposure time to the maximum exposure time was divided into several steps of time, and in a case of a formed image 2 in which an image, including a close-up of a face of the subject with a gray gradation background, was formed, the maximum number of times of light emission in the plural number of times of exposure, that is, the number of gradations is shown by the number of bits in Table 2, and the time period of the enable signal was appropriately adjusted and unified. By using an output condition 1 in which the density of an image formed in the maximum exposure time was approximately equal to the maximum density of a photosensitive material itself in the evaluation by visual observation, and an output condition 2 in which the density unevenness is scarcely remarkable in a solid image having an intermediate density, processing from image formation through development was carried out.

Concerning the obtained image, the maximum density was evaluated from a portion on the formed image 1 corresponding to the step of a high exposure time period or from a portion of a subject's hair. Further, the density unevenness was evaluated from an intermediate density portion of the formed image 1 or from a portion of a subject's skin of the formed image 2.

TABLE 2

| Example No. | Max. number of light emission | Number of gradation | Output condition |
|---|---|---|---|
| 1 | 9 | 512 | 1 |
| 2 | 9 | 512 | 2 |
| 3 | 12 | 4096 | 1 |
| 4 | 12 | 4096 | 2 |
| 5 | 16 | 65536 | 1 |
| 6 | 16 | 65536 | 2 |
| 7 | 17 | 131072 | 1 |
| 8 | 17 | 131072 | 2 |

When the number of gradations is more than 512, an image forming apparatus which can form a high quality image having excellent gradation continuity can be provided, little density unevenness, and acceptable maximum density, without increasing the complexity of the apparatus nor increasing the cost.

Further, when the number of gradations is less than 65536, each pixel can handled with a unit of 2 byte, on the other hand, when the number of gradations is more than 65536, it is necessary to handle each pixel with a unit of 3 byte. According, in the case that the number of gradations is less than 65536, the time period required for processing and the required memory capacity are reduced to almost ⅔, compared to the cases that the number of gradations is more than 65536, and the necessary circuit can be simplified, resulting in an acceptable apparatus.

Inventive Example 4

The light source of the binary recording element of the above described example, was replaced with a light source of a multi-valued recording element, and an image evaluation relating to a change of the number of gradations was carried out in the same manner as in Inventive Example 3. In this connection, the multi-valued recording element in Inventive Example 4 represents the following. For example, in the case of a 16-valued recording element, which represents a light source in which each recording element is controlled by the gradation control and the light emission time control at 16 levels (which correspond to levels expressed by 4 bits on the binary recording element). When the enable signals for 2 time exposures are set by using this light source, control of 256 gradations, at the maximum, can be carried out.

TABLE 3

| Example No. | Recording element | Max. number of light emission | Number of gradation | Output condition |
|---|---|---|---|---|
| 1 | 4 valued | 5 | 1024 | 1 |
| 2 | 4 valued | 5 | 1024 | 2 |
| 3 | 4 valued | 8 | 65536 | 1 |
| 4 | 4 valued | 8 | 65536 | 2 |
| 5 | 4 valued | 9 | 262144 | 1 |
| 6 | 4 valued | 9 | 262144 | 2 |
| 7 | 16 valued | 3 | 4096 | 1 |
| 8 | 16 valued | 3 | 4096 | 2 |
| 9 | 16 valued | 4 | 65536 | 1 |
| 10 | 16 valued | 4 | 65536 | 2 |
| 11 | 16 valued | 5 | 1048576 | 1 |
| 12 | 16 valued | 5 | 1048576 | 2 |

When the number of gradations is more than 512, an image forming aparatus can be provided, which can form a high quality image having an excellent gradation continuity, little density unevenness, and an acceptable maximum density, without increasing the complexity of the apparatus nor increasing the cost.

Further, when the number of gradations is less than 65536, a time period required for processing and the necessary memory capacity are reduced to almost ⅔, compared to the case in which the number of gradations is more than 65536, and the necessary circuit can be simplified, resulting in an acceptable apparatus.

Incidentally, the recording element in which light emission time can be controlled, was used as the multi-valued recording element in Inventive Example 4, however, when the multi-valued recording element in which light emission intensity can be controlled is used, an appropriate enable signal is set, so that the image can be formed.

In Inventive Examples 3 and 4, even when exposure is carried out by using respective 3 color recording heads 3R, 3G and 3B independently, and an image is formed, almost the same effects can be obtained. In the case where each of the 3 color recording heads is used so that an natural image such as the formed image 2, is outputted, it is most effective that the green light source recording head 3G is controlled within the range of the present invention, so that an acceptable image is formed.

Inventive Example 5

After the correction by Correcting Method 5-1 same as in Inventive Examples 1 and Correcting Method 5-2 same as in Inventive Example 2, images were formed and evaluation was conducted with the same method as that in Inventive Examples 3 and 4. As a result, high quality image having irregularities fewer than Inventive Examples 3 and 4 could be obtained.

Further, by Correcting Method 5-2, an excellent image having density unevenness less than that by Correcting Method 5-1, in particular, having fine pitch and less unevenness could be obtained. In Inventive Examples 1, 2 and 5, as the density measuring device, Konica Microdensitometer PDM-5 Type BR, manufactured by Konica Corporation was used. Instead of it, various types of scanners such as a flat bed scanner and a commercial drum scanner were used to measure the density. The same evaluation technique of Inventive Examples 1 and 2 was conducted for the measured density. As a result, the same effects were obtained.

In Inventive Examples 1 and 2, as the reference summed-up density (Do) and the reference summed-up light amount (Po), the average value of all recording elements was used.

Instead of it, the maximum value or the minimum value among th values of all recording elements was used and the same evaluation was conducted. As a result, the same effects were obtained.

In Inventive Examples 1 and 2, the image for the correction process and the image for the evaluation were formed on printing paper (papers including a silver halide photosensitive material). As the silver halide photosensitive material, a transparent or a semitransparent printing paper, a negative film, a reversal film, a reversal paper, a monochrome photosensitive material, and a photosensitive material having a self-processing solution such as an instant photosensitive material may be used and the same effects can be obtained.

Further, a photosensitive material on which the image for the correction process is formed may be different from a photosensitive material on which an image is actually formed. With regard to a point that the correction including the characteristic of the photosensitive material can be conducted, it is preferable to use the same photosensitive material.

Still further, when necessary, the correction is conducted with the use of the obtained correction value, then the image for the correction process is outputted. The obtaining operation to obtain the correction value in the same manner may be repeated.

Inventive Example 6

The correction was conducted in the following procedure in the LED array which was the red light source printing head 30a and the images A and B for the evaluation were outputted.

1) On condition that the two neighboring recording elements (ith and i+1th elements) are emitting light respectively, the light receiving element 55 measured the total luminance (E2i) of the two recording elements. A light receiving sensor large enough to measure the luminance of the two elements simultaneously was used.

2) The above measurement was conducted for each element sequentially under the control of the light receiving sensor driving system 61 on the basis of the light receiving sensor control section 61.

3) In the correction data calculating section 68, the following averaging process was conducted for the measurement value (E2i) and the luminance (Ei) was obtained for each element.

$$Ei=(E2i+E2i+1)/4$$

4) A correction value (Ci) was calculated from the luminance ratio of a reference luminance data (Eo: the average value of all summed-up luminance data) to the obtained luminance data (Ei), and the correction value was stored in the correction memory 66.

$$Ci=Eo/Ei$$

5) The image data to be evaluated were multiplied with the correction data by the multiplier 41, and the printing paper 2 was exposed with the corrected image data.

6) The exposed printing paper was subjected to a predetermined developing process, whereby the image data to be evaluated was obtained.

For the obtained image, the same evaluation of Inventive Example 1 was conducted.

As a result, with regard to Image A for the evaluation, Inventive Example 6 showed less unevenness in terms of large-pitch unevenness and a uniform image in each density in comparison with Comparative Example 1.

Further, with regard to Image B, Inventive Example 6 showed a higher quality image with less unevenness in terms of large-pitch unevenness and better continuous gradation in gradation of the background and in the skin of the person in comparison with Comparative Example 1.

In Inventive Example 6, while a single set of sensors was being moved along the array, the measurement for each element was conducted. However, if plural sets of sensors are used, the same effects can be obtained. Further, if a sensor array such as a linear CCD is used and the measurement is conducted without moving the sensor, the same effects can be obtained.

Further, the luminance (Ei) of each element was obtained by the averaging process, the calculating process is not limited to this example. If the luminance (Ei) of each element is obtained by the calculating process such as a center value, the same effects can be obtained.

Still further, the simultaneously emitting light of the two elements was indicated as one example. A number of the measurement is not limited to this example. If the plural elements emit light simultaneously, the same effects can be obtained by obtaining the luminance (Ei) for each element with an appropriate calculating process.

Inventive Example 7

The correction was conducted in the following procedure in the LED array which was the red light source printing head 30a and images A and B for the evaluation were outputted.

1) In an element chip (128 pixel in this embodiment) constructing LED array, the luminance (E1(j), E2(j), E3(j), E4(j)) were measured by the light receiving sensor 55 under the conditions indicated below.

(j: element No. in the chip)

E1(j) luminance measured on condition that a single recording element was emitting light.

E2(j) the total luminance of two neighboring recording elements (jth and j+1th elements) were measured on condition that the two neighboring recording elements were emitting light.

E3(j) the total luminance of three neighboring recording elements (j−1th, jth and j+1th elements) were measured on condition that the three neighboring recording elements were emitting light.

E4(j) the total luminance of four neighboring recording elements (j−1th, jth, j+1th and j+2th elements) were measured on condition that the four neighboring recording elements were emitting light.

A light receiving sensor large enough to measure the luminance of the four elements simultaneously was used.

2) The above measurement was conducted for each element sequentially under control of the light receiving sensor driving system 61 on the basis of the light receiving sensor control section 61.

3) In the correction data calculating section 68, the calculating process was conducted on the basis of the measurement values (E1(j), E2(j), E3(j), E4(j)), the luminance (E128(j)) of a single recording element was obtained on condition that all elements in the chip were emitting light simultaneously.

Figure 12:
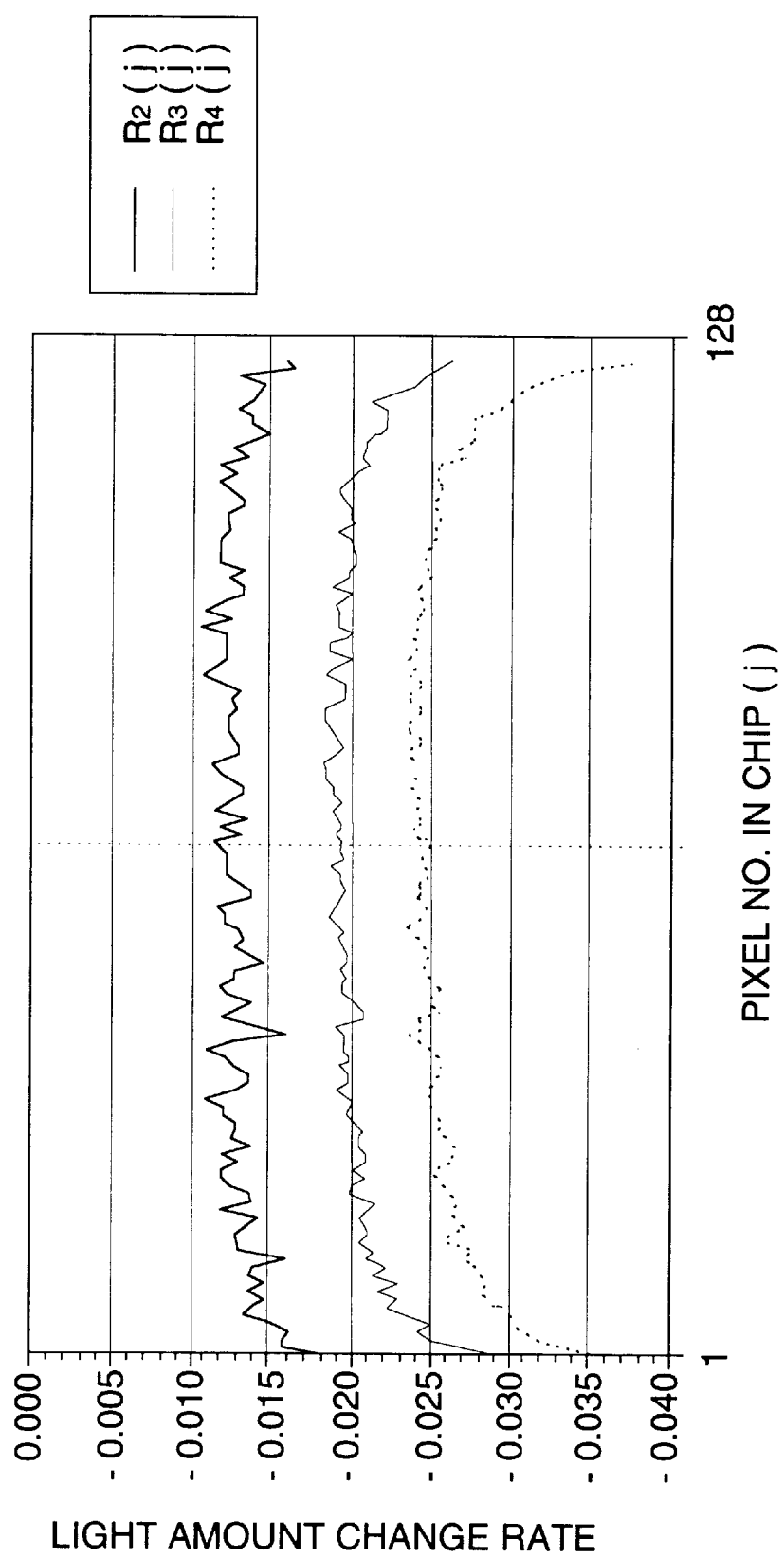
FIG. 12 is a diagram showing the light amount change-ratio in a single chip.

In this example, the following calculating processes were conducted:

E1(j) was assumed as the reference and light amount change rate R2(j), R3(j), R4(j) were obtained as shown in FIG. 12.

$$R2(j)=(E2(j)-(E1(j)+E1(j+1)))/(E1(j)+E1(j+1))$$

$$R3(j)=(E3(j)-(E1(j-1)+E1(j)+E1(j+1)))/(E1(j-1)+E1(j)+E1(j+1))$$

$$R4(j)=(E4(j)-(E1(j-1)+E1(j)+E1(j+1)+E1(j+2)))/(E1(j-1)+E1(j)+E1(j+1)+E1(j+2))$$

Each of light amount change rates R2(i), R3(i) and R4(i) were subjected to the regression process with a second order function so as to obtain A(2), A(3) and A(4).

$$R2(X)=A(2)\times X^2+B(2)\times X+C(2)$$

$$R3(X)=A(3)\times X^2+B(3)\times X+C(3)$$

$$R4(X)=A(4)\times X^2+B(4)\times X+C(4)$$

The regression process was conducted with a natural logarithm function $(A(y)=d\times \ln(y)+h)$ so as to obtain A(128).

On the condition that all elements in the chip were emitting light, the light amount change rate $R128(X)=A(128)\times X^{**}2+B(128)\times X+C(128)$ and its inclination $S(128)= 2\times A(128)\times X+B(128)$ were assumed to be 0(zero) around the center (X=63), and B(128) and C(128) were thus obtained.

The correction value (C(i)) for the deviation among pixels were calculated with the use of the obtained light amount change rate $R128(X)=A(128)\times X^2+B(128)\times X+C(128)$.

(j: element No. in the chip)
j=1 to 32 C(i)=1/(E1(j)×R128k(32))
j=33 to 96 C(i)=1/(E1(j)×R128k(j))
j=97 to 128 C(i)=1/(E1(j)×R128k(97))

4) The above correction value was obtained for each chip, whereby the correction value (Ci) was obtained for each element and stored in the correction memory 66.

5) On the basis of the obtained correction value (Ci), the correction was conducted in the same way of Comparative Example 1, and the image for the evaluation was outputted.

For the obtained image, the same evaluation of Inventive Example 1 was conducted.

As a result, with regard to Image A for the evaluation, Inventive Example 7 showed less unevenness even in terms of small-pitch unevenness and a more uniform image in each density in comparison with Inventive Example 6. Further, with regard to Image B, Inventive Example 7 showed a higher quality image with less unevenness in terms of smaller-pitch unevenness and good continuous gradation in the gradation of the background and in the skin of the person in comparison with Inventive Example 6.

In Inventive Example 7, with the calculating process, the luminance of a single recording element was obtained on the condition that all elements in the chip were emitting light simultaneously. However, the luminance of a single recording element may be obtained on a similar condition of an actually image-outputting condition that plural elements in the chip are emitting a light simultaneously. As a result, the same effects can be obtained.

Further, the type of the calculating process is not limited to above example. With a proper calculating process in accordance with the characteristic of a used-array light source, the luminance of a single recording element may be obtained on condition that plural elements in the chip are emitting a light simultaneously. Whereby the same effects can be obtained. For example, for the portion to be subjected to the regression process with a second order function or a natural logarithm function, a proper function may be used in accordance with the characteristic of the used array light source.

Still further, in Inventive Example 7, the correction value (Ci) for each element was obtained by subjecting the measurement value obtained on condition that No. 2, 3, 4 neighboring elements were emitting a light simultaneously to the calculating process with the use of the measurement value obtained on the condition that a single element was emitting light. However, by obtaining the correction value (Ci) for each element by subjecting the measurement value obtained on the condition that plural elements are emitting light simultaneously to the calculating process with the use of the measurement value obtained on the condition that a single element was emitting light, the same effects can be obtained.

Inventive Example 8

In stead of correction data calculating means of the abovementioned Examples on the basis of light amount measurement by receiving light sequentially with recording head 30, correction amount was calculated on the basis the following method, correction was conducted, and then the same image evaluation as that in Inventive Examples 3 and 4 was conducted.

Correcting Method 8-1

In LED array of red light source recording head 30a, a correction was conducted by the following procedure and recording images 1 and 2 were obtained.

1) While adjoining 2 recording elements (the i th and the i+1 in recording elements) were emitted, the total brightness ($E_{i,\ i+1}$) of the 2 recording elements was measured by a light receiving sensor 55.
2) While two recording elements in every 2 recording elements (the i th and the i+2 th recording elements) were emitted, the total brightness ($E_{i,\ i+2}$) of the 2 recording elements was measured by a light receiving sensor 55.
3) Measurements in the above 1) and 2) were successively conducted on each recording element under the control by a light receiving sensor driving system 62 on the basis of a light receiving sensor control section 61.
4) By conducting the following calculation process for the measurement value in the correction data calculating section 68, a rough calculation brightness (Ei) was obtained for each recording element.

$$E_i=(E_{i-1,\ i}+E_{i,\ i+1}-E_{i-1,\ i+1})/2$$

5) Correction data ($C_i$) was calculated according to a ratio of the brightness of the obtained brightness ($E_i$) and the reference brightness ($E_0$) (an averaged value of all brightness values), and was stored in the correction memory 66.

$$Ci=E_0/E_i$$

6) An image is formed in the same manner as in Inventive Example 3 and 4 on the basis of the obtained correction data ($C_i$).

Incidentally, a sensor was used, which had a measuring area and a measuring range sufficient to measure the brightness of the 2 recording elements without decreasing the brightness.

Correcting Method 8-2

In LED array of red light source recording head 30a, a correction was conducted as same as that in Inventive Example 7 and recording image was formed and evaluation was conducted with the same manner as that in Inventive Examples 3 and 4.

In this connection, as the sensor, a sensor was used, which has a measuring area and a measuring range sufficient to measure the brightness of 4 recording elements without decreasing the brightness. FIG. 12 shows an example of the changing ratio of the light amount according to the example of this experiment.

As a result of evaluation of the image, in correcting method 8-1, formed images 1 and 2 indicated high quality image having fewer density unevenness than Inventive Examples 3 and 4 within a gradation level range of the present invention, in particular, fewer relatively large irregularities on the whole. Further, in correcting method 8-2, an excellent image was obtained in which the density unevenness was less than in correcting method 8-1, and specifically, fine pitch irregularities was fewer.

Inventive Example 9

The correction was conducted in the following procedure in VFPH in which yellow filter being the green light source printing head 30b was arranged, and images A and B for the evaluation were outputted.

1) On condition that all recording elements were emitting light, the light receiving element 55 measured the luminance (Ei) of a single recording element (ith element). The light receiving element was sheltered with the aperture so as not to receive a light from the other element and a sensor capable of measuring only a light from a pixel to be measured was used.

2) The above measurement was conducted for each element sequentially under control of the light receiving sensor driving system 61 on the basis of the light receiving sensor control section 61.

3) A correction value (Ci) was calculated from the luminance ratio of a reference luminance data (Eo: the average value of all summed-up luminance data) to the obtained luminance data (Ei), and the correction value was stored in the correction memory 66.

$$Ci = Eo/Ei$$

4) The image data to be evaluated were multiplied with the correction data by the multiplier 41, and the printing paper 2 was exposed with the corrected image data.

5) The exposed printing paper was subjected to a predetermined developing process, whereby the image data to be evaluated was obtained.

Comparative Example 3

The correction was conducted in the following procedure in VFPH in which yellow filter being the green light source printing head 30b was arranged, and images A and B for the evaluation were outputted.

1) On condition that only a single element was emitting light, the light receiving element 55 measured the luminance (Ei).

2) The above measurement was conducted for each element sequentially under control of the light receiving sensor driving system 61 on the basis of the light receiving sensor control section 61.

3) On the basis of the obtained luminance (Ei), the correction was conducted in the same way as Comparative Example 1, and the image for the evaluation was outputted.

As a result, with regard to both Image A and Image B for the evaluation, Inventive Example 9 showed a high quality image which was less unevenness, uniform and good continuous gradation in comparison with Comparative Example 3.

Inventive Example 10

Instead of correction data calculating means of the above-mentioned Examples on the basis of light amount measurement by receiving light sequentially with recording head 30, correction amount was calculated on the basis the following method, correction was conducted, and then the same image evaluation as that in Inventive Examples 3 and 4 was conducted.

Correcting Method 10

In VFPH in which an yellow filter of a green recording head 30b, a correction was conducted in the following manner and forms images 1 and 2 were obtained.

The brightness (Ei) of one recording element (the i th element) was measured by a light receiving sensor 55 under the condition of light emission of all recording elements. As the light receiving sensor 55, a sensor was used which can effectively receive the light from one recording element to be measured, by using an aperture so that the sensor was not affected by the light from the other recording elements.

2) The above measurement was successively carried out for each recording element under the control by a light receiving sensor driving system 62 on the basis of a light receiving sensor control section 61.

Correction data ($C_i$) was calculated from the brightness ratio of the obtained brightness ($E_i$) to the reference brightness ($E_0$) (an average value of all brightness values), and is stored in the correction memory 66.

$$Ci = E_0/E_i$$

4) The image formation was carried out by the same method as in Inventive Examples 3 and 4, on the basis of the obtained correction data ($C_i$).

As a result of evaluation of the image, within a gradation level range of the present invention, formed images 1 and 2 both indicated high quality image having fewer relatively large irregularities on the whole, fewer fine pitch irregularities and fewer density unevenness than Inventive Examples 3 and 4.

In Inventive Examples 9 and 10, the sensor which was shielded from light by an aperture was used. However, with another methods of preventing a measurement from being influenced by light emitted from other sensors, such as a method of using a sensor having high directivity, a method of collecting light by using a lens, or a method of introducing light of only a specific pixel by using a optical fiber, a similar effect may be obtained.

Inventive Example 11

The correction was conducted in the following procedure in VFPH in which an LED array being a red light source printing head 30a and a yellow filter being the green light source printing head 30b were arranged and in VFPH in which a blue filter being the blue light source printing head 30c was arranged, and the image B for the evaluation was outputted.

The correction was conducted for the printing heads 30a, 30b and 30c in the same way as Inventive Example 2, and the image for the evaluation was outputted.

Comparative Example 4

The correction was conducted for printing heads 30a, 30b and 30c in the same way as Comparative Example 2, and the image for the evaluation was outputted.

The visual evaluation was conducted for the obtained images in terms of density unevenness and gradation.

As a result, in comparison with Comparative Example 4, Inventive Example 11 showed a high quality image which had less unevenness and better continuous gradation in gradation of the background and in the skin of the person.

Inventive Example 12

The correction was conducted for a printing head 30a by the same manner as in Inventive Example 9, for printing head 30b and 30c by the same manner as in Inventive Example 7, and an image for evaluation was outputted.

Comparative Example 5

The correction was conducted for printing heads 30a, 30b and 30c in the same way as Comparative Example 3, and the image for evaluation was outputted.

The visual evaluation was conducted for the obtained images in terms of density unevenness and gradation.

As a result, in comparison with Comparative Example 5, Inventive Example 12 showed a higher quality image which was less unevenness and better continuous gradation in gradation of the background and in the skin of the person.

Inventive Example 13

A LED array of a red recording head 30a, a VFPH in which a yellow filter of a green recording head 30b was arranged and a VFPH in which a blue filter of a blue recording head 30c was arranged, were respectively corrected by using the method described in Inventive Examples 5, 8 and 10, and a formed image 2 was outputted by three color exposures. The same effect could be obtained over a gradation level range of the present invention.

Further, in the above case, when a natural image, such as the formed image 2, was formed, the most conspicuous effect could be attained in the case where the present invention was applied for the green record in g head.

In Inventive Examples 3, 4, 5, 8, 10, 11, 12 and 13, the density measurement and the luminance measurement were taken as examples, the combination of the density measurement and the luminance measurement may be used. Further, the density measuring means and the luminance measuring means may be incorporated into the image forming apparatus, or correction data may be calculated at the outside, stored in a memory and used from the memory without incorporating the density measuring means and the luminance measuring means in the image forming apparatus.

The same kind of array light source described here, shows an array light source in which characteristics of light emission is approximately similar to each other when a plurality of recording elements emit the light.

Figure 13:
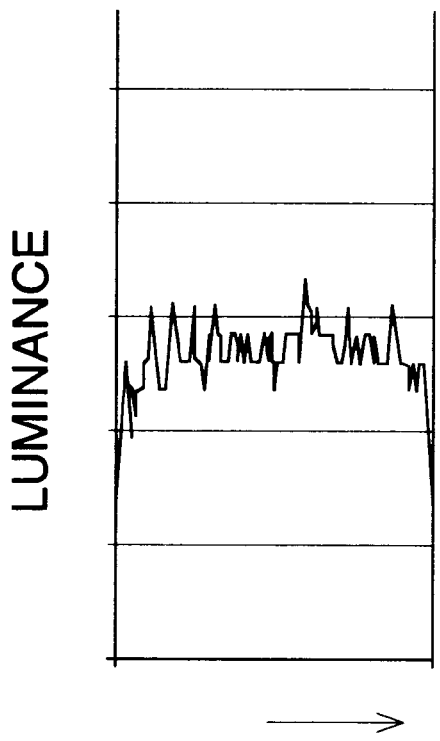
FIGS. 13(a) and 13(b) are diagrams showing examples of similar characteristics.
Figure 13:
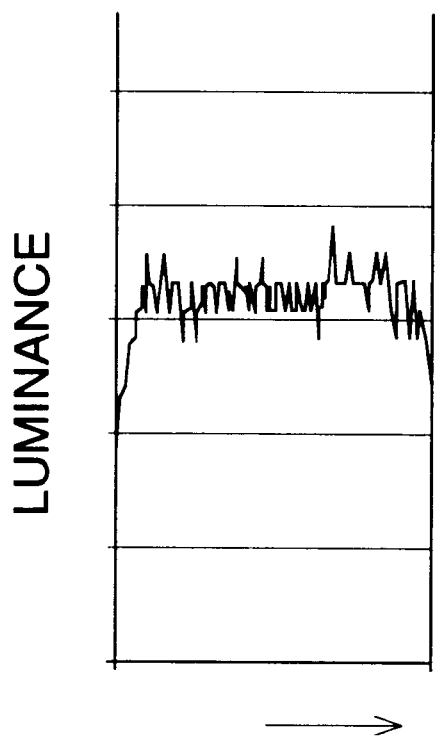

Examples (a) and (b) of the same kind of array light sources are shown in FIG. 13.

In the above Examples, the correction process was conducted by multiplying the correction value. However, the correcting method is not limited to this example. Correction by addition, subtraction and dividing may obtain the same result.

In the above Examples, the arrays in which the recording elements were aligned in a single line was used. However, with an array in which the recording elements are arranged in plural lines, if the exposure control is conducted so as to take proper timing between the image forming position of the printing head and the recording position on the photosensitive material, the same effects can be obtained.

In the three color exposures mentioned before, an enable signal of each bit of blue, green and red is adjusted so as to conform with a gradation characteristics and a sensitivity of each light sensitive layer of a silver halide light sensitive material, and each recording element is driven respectively so as to conduct On-Off recording plural times in accordance with the enable signal. Accordingly, it may be preferable, because a continuous gradation image having high resolution can be recorded on a silver halide light sensitive material by utilizing the characteristics of the silver halide light sensitive material without causing the apparatus to be complicate and high cost.

In the above Examples, as means for obtaining the correction value, an example using an array to be corrected was used was taken. However, as another example, in the event that the deviation of each recording element in the array in terms of light emission characteristics shows approximately the same characteristics in the same type of array, the correction value was obtained in advance with the use of another array of the same type, and then the correction may be conducted with the use of the correction value. By this way, the array to be corrected may be different from the array with which the correction value is obtained.

Incidentally, in the present embodiment, the enable signals were set in accordance with the weight of each bit at the time that the image data are represent by a binary value with the use of a binary value type light source. However, with the use of the multi value type light source, the enable signal may be set in accordance with it. For example, a technique in which an enable signal of double time exposure is set for each recording element with a light source capable of controlling 16 levels (4 bits) so that the gradation can be controlled at 256 levels may be considered. Further, an appropriate enable signal may be set with the use of a light source with which the luminance of the emitting light can be changed in addition to a light emitting time period, as the multi-value type light source.

In this embodiment, since the interval between the enable signals is set not smaller than 2 $\mu$s, the influence of the history of the light emission caused by the previous enable signal can be reduced, the gradation characteristics can be controlled by the time period of the enable signal.

In case that the interval time is shorter than 2 $\mu$s, the physical condition of the recording element or the photosensitive material between the previous light emission and the next light emission does not follow completely to On-Off operation due to its characteristics. As a result, the above physical condition becomes closer to the condition that light is continuously emitted, a stand-up pattern of the emitting light of the recording element may differ from that of ordinary cases due to the influence of the physical change (including a change in temperature) caused by the previous light emission, or there may be fear that the fluctuation in the uncontrollable exposure effect may appear. In the case that the interval time is not shorter than 2 $\mu$s, the above influence becomes extremely small.

Inventive Example 14

Figure 6:
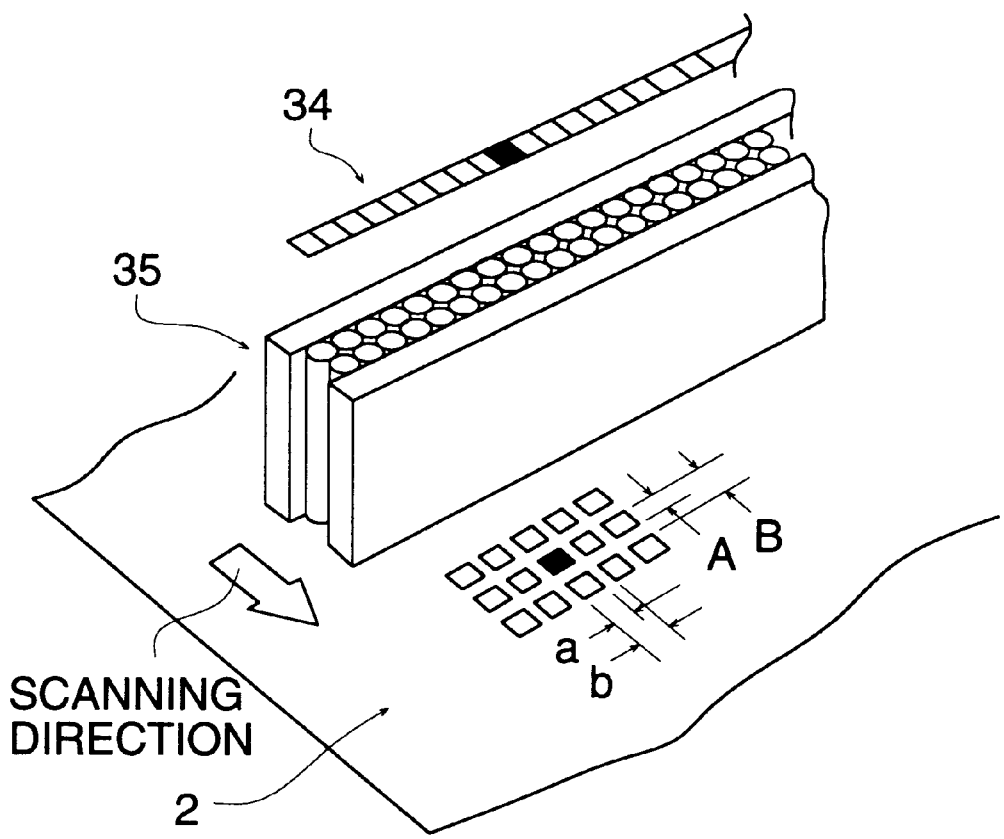
FIG. 6 is a view showing the size of a pixel exposed in a printing paper in the embodiment of the present invention.

FIG. 6 is a view showing the size of pixels to be exposed on printing paper. Light emitted from each element of the recording element array 34 is focused on the printing paper 2 through a Selfoc lens array 35. Now, with respect to the arranging direction of the recording element array 34, the exposure size of each pixel is defined as "a" and the recording pitch is defined "b". On the other hand, with respect to the vertical direction (a scanning direction), the exposure size of each pixel is defined as "A" and the recording pitch is "B". In condition of the above definition, an experiment was conducted in order to investigate the influence on the image quality by the exposure size and the recording pitch. A correction amount in the exposure amount of each recording element was obtained in the manner of the Inventive Examples mentioned above.

Initially, the exposure size and the recording pitch of each recording element array 34 was set as indicated below, and a wedge pattern with the gradation of 0 to 255 was exposed and outputted for each color using the method explained in FIG. 5.

|  |  | Red | Green | Blue |
|---|---|---|---|---|
| Arranging Direction: | Exposure Size (a) | 55 | 50 | 50 |
|  | Recording Pitch (b) | 62.5 | 62.5 | 62.5 |
| Scanning Direction: | Exposure Size (A) | 35 | 35 | 35 |
|  | Recording Pitch (B) | 62.5 | 62.5 | 62.5 |
|  | (unit: µm) | | | |

Figure 8:
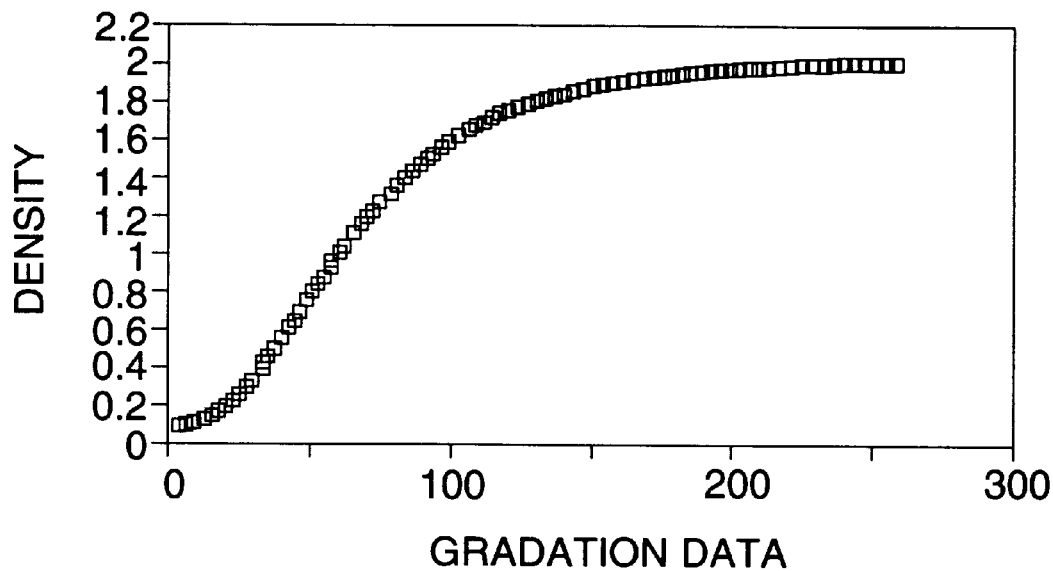
FIG. 8 is a view showing density characteristics of the embodiment of the present invention.

As a result, as shown in FIG. 8, with regard to the wedge of magenta by the green exposure, the wedge of cyan by the red exposure and the wedge of yellow by the blue exposure, the test result that the density characteristics were equal and that smooth continuous gradation was reproduced were respectively obtained.

Further, the exposure size and the recording pitch in relation to the arranging direction were changed as indicated below and the exposure size and the recording pitch in relation to the scanning direction were set to the same conditions as above.

|  |  | Red | Green | Blue |
|---|---|---|---|---|
| Arranging Direction: | Exposure Size (a) | 40 | 35 | 35 |
|  | Recording Pitch (b) | 62.5 | 62.5 | 62.5 |
|  | (Unit: µm) | | | |

In this case, discontinuous gradation was observed in low density portions and maximum saturated density became a slightly lower density than solid black due to the presence of the irregular white.

Further, the exposure size and the recording pitch in relation to the arranging direction were changed as indicated below and the exposure size and the recording pitch in relation to the scanning direction were set to the same condition as above.

|  |  | Red | Green | Blue |
|---|---|---|---|---|
| Arranging Direction: | Exposure Size (a) | 82 | 82 | 82 |
|  | Recording Pitch (b) | 62.5 | 62.5 | 62.5 |
|  | (Unit: µm) | | | |

In this case, the area exposed by a single element became large, resulting in the test result that depicting capability for fine patterns was lowered and sharpness was also lowered.

Still further, the exposure size and the recording pitch were changed as indicated below:

|  |  | Red | Green | Blue |
|---|---|---|---|---|
| Arranging Direction: | Exposure Size (a) | 55 | 50 | 50 |
|  | Recording Pitch (b) | 62.5 | 62.5 | 62.5 |
| Scanning Direction: | Exposure Size (A) | 15 | 12 | 12 |
|  | Recording Pitch (B) | 62.5 | 62.5 | 62.5 |
|  | (unit: µm) | | | |

In this case, the irregular white occurred in the high density portion, resulting in the test result that the maximum saturated density was slightly lowered.

Still further, the exposure size and the recording pitch were changed as indicated below:

|  |  | Red | Green | Blue |
|---|---|---|---|---|
| Arranging Direction: | Exposure Size (a) | 55 | 50 | 50 |
|  | Recording Pitch (b) | 62.5 | 62.5 | 62.5 |
| Scanning Direction: | Exposure Size (A) | 75 | 75 | 75 |
|  | Recording Pitch (B) | 62.5 | 62.5 | 62.5 |
|  | (unit: µm) | | | |

In this case, overlapping among pixels was caused, resulting in the test result that the visual density increased slightly when On-Off recording was repeated for each line.

Further the correction for a light amount of each recording element was conducted in the same manner as in Inventive Example 13, a size of a recording element array 34 for each color and a recording pitch were set as shown in Table 4, and an experiment was conducted in the same manner as the above Example except that a wedge pattern having gradation levels of 0 to 4095 for each color is exposed and outputted by the method explained in FIG. 14.

TABLE 4

| No. | Recording head | Pixel arrangement | | | | | |
|---|---|---|---|---|---|---|---|
| | | a (µm) | b (µm) | a/b (µm) | A (µm) | B (µm) | A/B (µm) |
| 1 | Red | 40.0 | 62.5 | 0.64 | 35.0 | 62.5 | 0.56 |
|  | Green | 35.0 | 62.5 | 0.56 | 35.0 | 62.5 | 0.56 |
|  | Blue | 35.0 | 62.5 | 0.56 | 35.0 | 62.5 | 0.56 |
| 2 | Red | 50.0 | 62.5 | 0.80 | 35.0 | 62.5 | 0.56 |
|  | Green | 45.0 | 62.5 | 0.72 | 35.0 | 62.5 | 0.56 |
|  | Blue | 45.0 | 62.5 | 0.72 | 35.0 | 62.5 | 0.56 |
| 3 | Red | 75.0 | 62.5 | 1.20 | 35.0 | 62.5 | 0.56 |
|  | Green | 70.0 | 62.5 | 1.12 | 35.0 | 62.5 | 0.56 |
|  | Blue | 70.0 | 62.5 | 1.12 | 35.0 | 62.5 | 0.56 |
| 4 | Red | 85.0 | 62.5 | 1.36 | 35.0 | 62.5 | 0.56 |
|  | Green | 80.0 | 62.5 | 1.28 | 35.0 | 62.5 | 0.56 |
|  | Blue | 80.0 | 62.5 | 1.28 | 35.0 | 62.5 | 0.56 |
| 5 | Red | 55.0 | 62.5 | 0.88 | 15.0 | 62.5 | 0.24 |
|  | Green | 50.0 | 62.5 | 0.80 | 15.0 | 62.5 | 0.24 |
|  | Blue | 50.0 | 62.5 | 0.80 | 15.0 | 62.5 | 0.24 |
| 6 | Red | 50.0 | 62.5 | 0.80 | 55.0 | 62.5 | 0.88 |
|  | Green | 45.0 | 62.5 | 0.72 | 55.0 | 62.5 | 0.88 |
|  | Blue | 45.0 | 62.5 | 0.72 | 55.0 | 62.5 | 0.88 |
| 7 | Red | 55.0 | 62.5 | 0.88 | 70.0 | 62.5 | 1.12 |
|  | Green | 50.0 | 62.5 | 0.80 | 70.0 | 62.5 | 1.12 |
|  | Blue | 50.0 | 62.5 | 0.80 | 70.0 | 62.5 | 1.12 |

As can be seen from the above test results, when the ratio of the exposure size in the recording element arranging direction to the recording pitch in the recording element arranging direction is in the range of 0.7 to 1.2, and the ratio of the exposure size in the vertical direction in the recording element arrangement to the recording pitch in the vertical direction is in the range of 0.3 to 1.0, continuous gradation characteristics is obtained.

Further, under the above condition, a wedge pattern for each color and a natural image like the formed image 2 in the beforementioned Example were outputted and the evaluation was conducted visually. As a result, in Nos. 2, 3 and 6, high quality images excellent in rough texture in comparison with Nos. 1 and 5 and in sharpness in comparison with Nos. 4 and 7 could be obtained. Further, in Nos. 2, 3 and 6, it became possible to depict a continuous gradation whose density change is smooth for gradation change.

Further, the exposure size and the recording pitch were set as indicated below:

|  |  | Red | Green | Blue |
|---|---|---|---|---|
| Arranging Direction: | Exposure Size (a) | 55 | 50 | 50 |
|  | Recording Pitch (b) | 62.5 | 62.5 | 62.5 |
| Scanning Direction: | Exposure Size (A) | 35 | 35 | 35 |
|  | Recording Pitch (B) | 62.5 | 62.5 | 62.5 |
|  | (unit: $\mu$m) |  |  |  |

On the above condition, the experiment was conducted in such a manner that the ratio C of the time period from the starting of the light emission to the ending of the light emission for one line to the recording time cycle for the one line was changed to 4 cases as indicated below:

(a) C=0.18, (b) C=0.3, (c) C=0.68, and (d) C=0.8

The following test results were obtained:

In the case of (a), irregular white occurred in a high density portion and the maximum saturated density was slightly lowered. In the case of (b), the depicting capability for fine patters were lowered. On the other hand, in the cases of (c) and (d), a smooth continuous gradation was obtained without the above problems.

As can be seen from the above results, with the recording conducted so as to satisfy the relationship of $0.8 \leq (A/B+C) \leq 1.3$, continuous gradation characteristics were obtained.

Moreover, an enable signal was changed in accordance with formula ($2^n$T+t) in the generating section of the enable signal for each color, wherein "n" is either 0, 1, 2, . . . or 7 and represents bit No. of a digital value in the case that the time period of the enable signal was converted into a digital value in accordance with the gradation of the image data, "T" is a unit of time, and "t" is a time constant of either positive or negative value.

|  | t = 3 B | t = 5 G | t = 8 R |
|---|---|---|---|
| MSB | 1539 | 2565 | 5128 |
| 2nd bit | 771 | 1285 | 2568 |
| 3rd bit | 387 | 645 | 1288 |
| 4th bit | 195 | 325 | 648 |
| 5th bit | 99 | 165 | 328 |
| 6th bit | 51 | 85 | 168 |
| 7th bit | 27 | 45 | 88 |
| LSB | 15 | 25 | 48 |
|  | (Unit: $\mu$s) |  |  |

Figure 9:
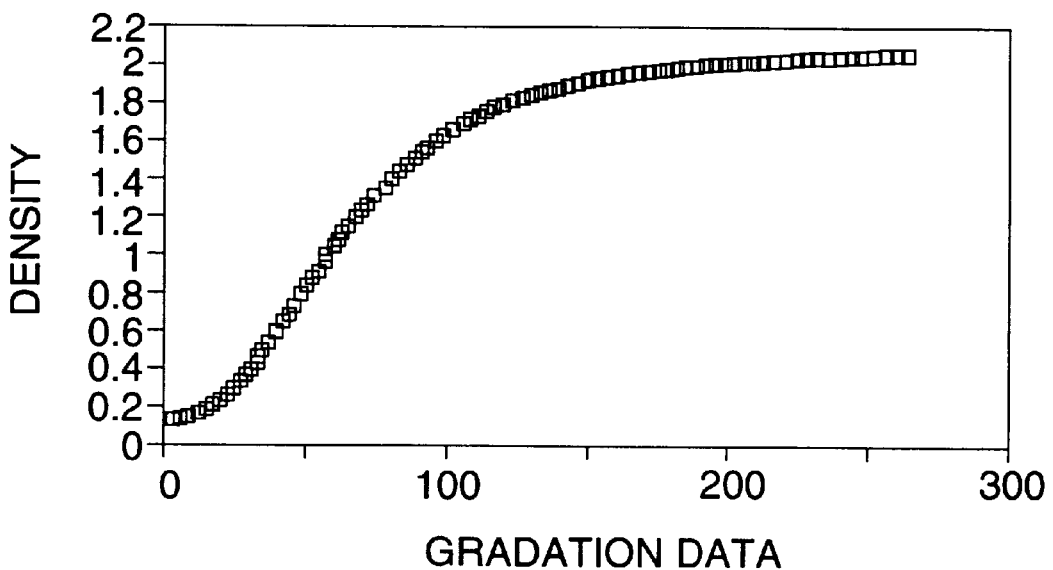
FIG. 9 is a view showing density characteristics of the embodiment of the present invention.

In this case, since the time period of the enable signal could be adjusted individually for each signal for each count value as shown with the wedge density characteristics of magenta by the green exposure in FIG. 9, each measuring point could be made continuous or equal so that smoother gradation recording could be conducted. Incidentally, with regard to the cyan wedge by the red exposure and the yellow wedge by the blue exposure, the same results as above were obtained.

Figure 16:
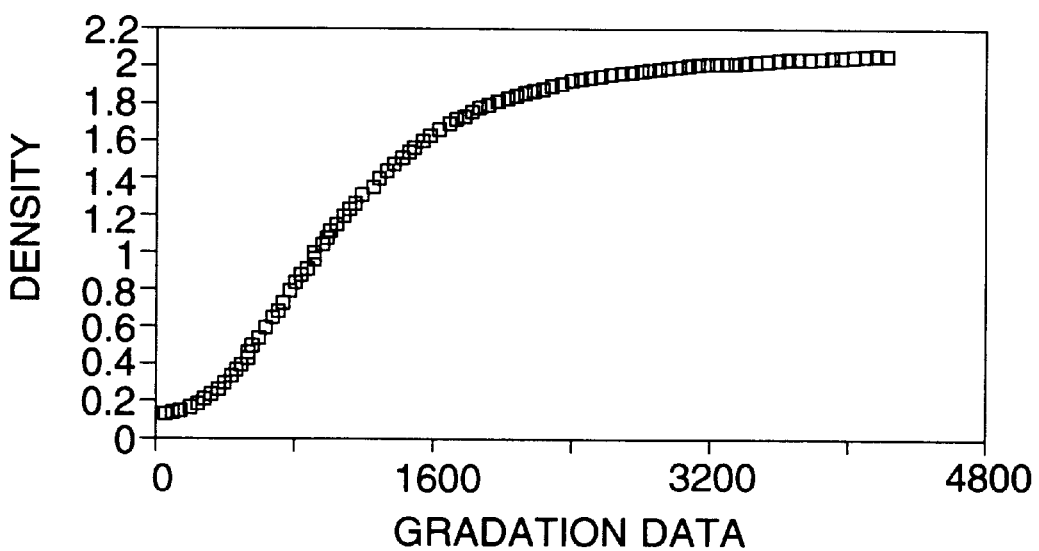
FIG. 16 is a graph showing a wedge density characteristics of cyan coloring by red exposure.

In the case that, among a generating period of an enable signal for each color, a generating period in the red recording is determined as shown below by changing an enable signal in $2^n$T+t (n is 0, 1, 2, - - - 11 and represents a figure of a digital value when an each time width of the enable signal is made in the digital value in accordance with the gradation of an image data, T is a unit time, and t is a given positive time or a negative given time and is 0.4 $\mu$sec. in this experiment), since the time width of the enable signal can be adjusted respectively for each signal for each counter value as shown by a wedge density characteristics of a cyan color by a red color exposure in FIG. 16, each measuring point becomes continuous or equivalent so that smooth gradation recording can be conducted.

| MSB | 205.2 |
|---|---|
| 2nd bit | 102.8 |
| 3rd bit | 51.6 |
| 4th bit | 26.0 |
| 5th bit | 13.2 |
| 6th bit | 6.8 |
| 7th bit | 3.6 |
| 8th bit | 2.0 |
| 9th bit | 1.2 |
| 10th bit | 0.8 |
| 11th bit | 0.6 |
| LSB | 0.5 |

As indicated above, in a conventional technique, a neutral color balance was slightly changed depending on the density due to the discontinuity in gradation depending on the responding characteristics of the recording element and the characteristics of the photosensitive material. However, in the embodiment of the present invention, the gradation becomes continuous and smooth gradation can be obtained, resulting in neutral ability being improved and the image quality being enhanced.

Figure 7:
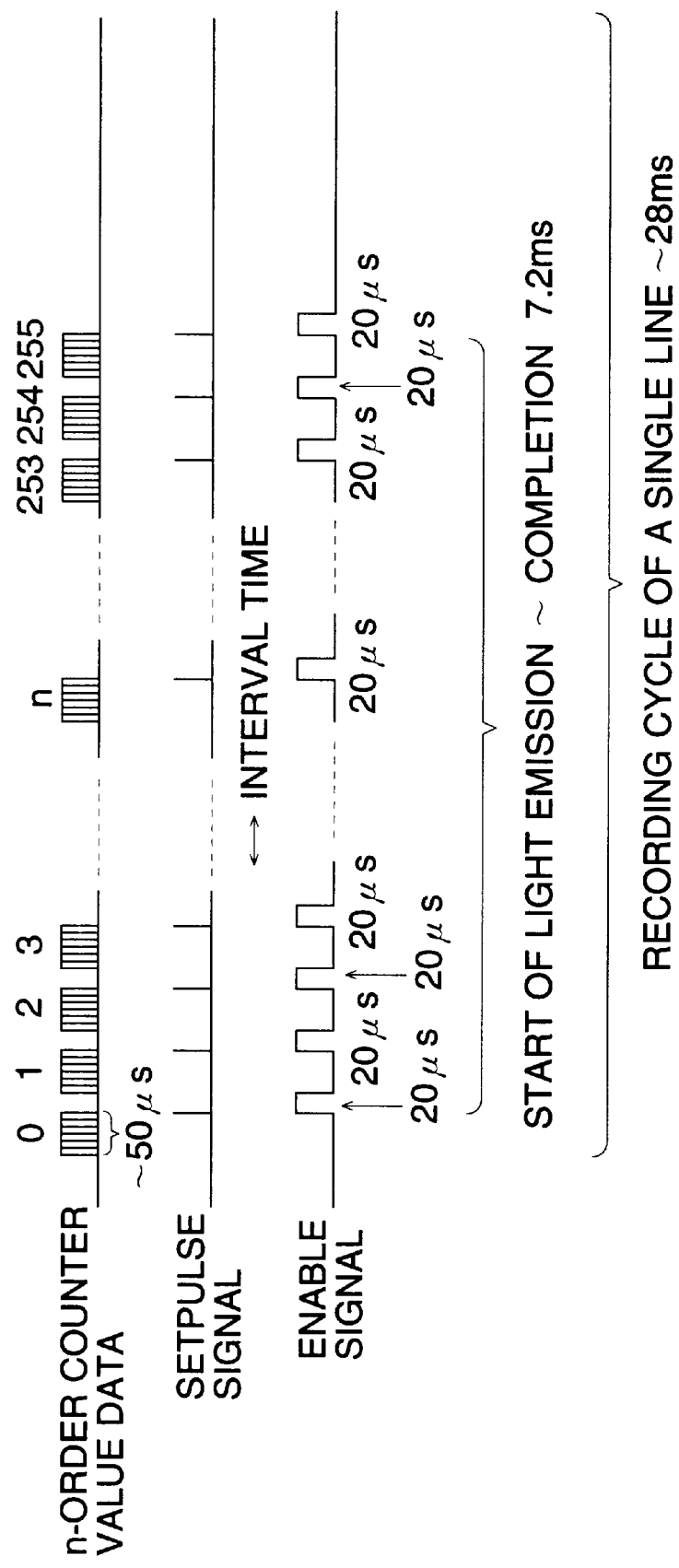
FIG. 7 is a timing chart indicating an output signal from the printing head control section of the embodiment of the present invention.

FIG. 7 is a timing chart showing another embodiment for the output signal from the printing head controlling section 40.

In this embodiment, there is provided a "n" order counter (for example "n" =256 in the case of 256 gradation) to drive the recording element by the number of times in accordance with the density of each pixel. The count value is compared with the density value of each pixel. When the density value is larger, "1" signal is transmitted to shift register 31 so that the driving signal is made in its active condition during that time. On the other hand, when the density is smaller, "0" signal is transmitted and the active condition is ended so that only the driving signal corresponding to the density of the pixel becomes an allowable condition. Then, the light emission control is conducted in such a way that a unit time during which the driving signal becomes active for each time is 12 $\mu$s for blue, 20 $\mu$s for green, and 40 $\mu$s for red. In other words, in the case of 256 gradations, the gradation is depicted by generating the enable signal 256 times for each pixel. With this technique, the test result that the same wedge density characteristics of magenta by the red exposure as shown in FIG. 8 could be obtained was acknowledged. Incidentally, with regard to the cyan wedge by the red exposure and the yellow wedge by the blue exposure, the same results were be obtained.

In this way, according to this embodiment, it is not necessary to set an enable signal for each bit, and good gradation can be obtained with rather simple construction.

Figure 17:
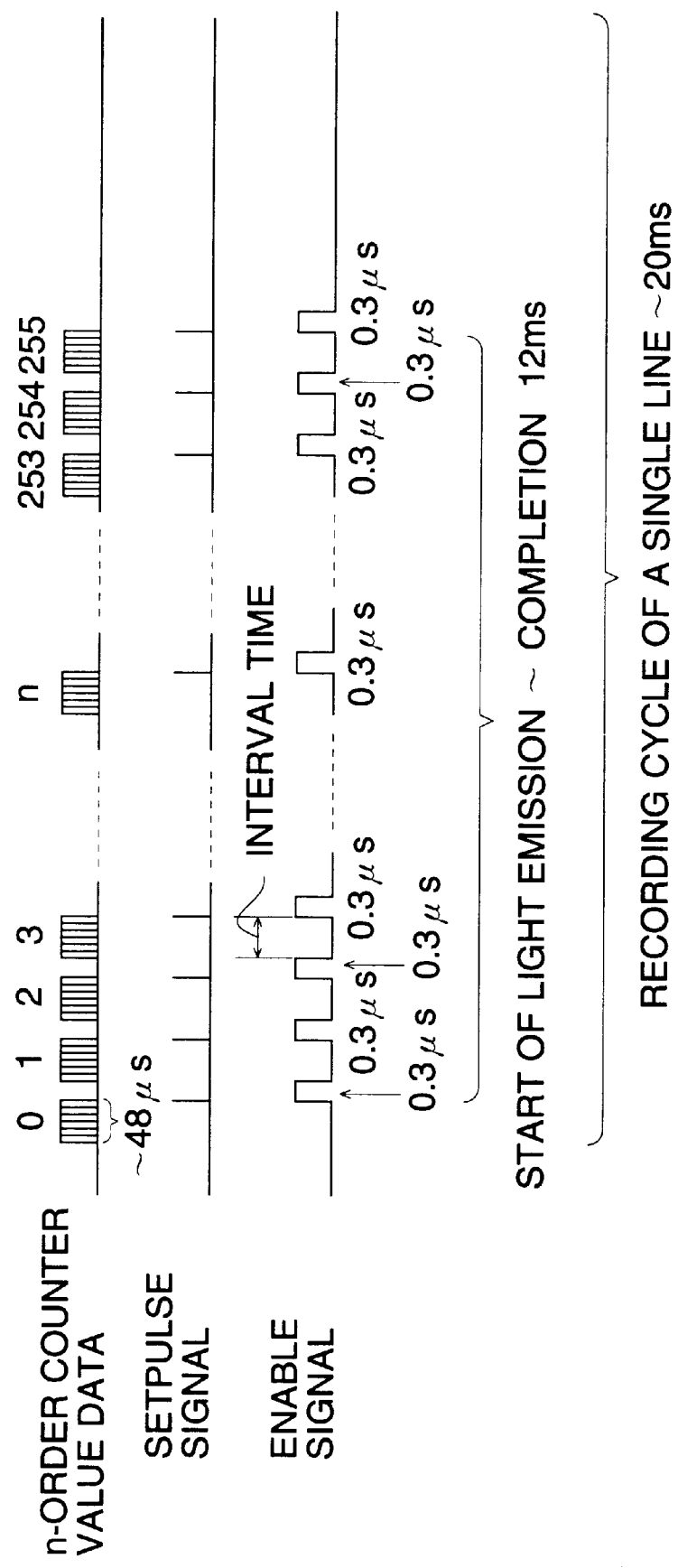
FIG. 17 is a timing chart of output signals outputted from a recording head control section in another example.

FIG. 17 is a timing chart showing another embodiment of an output signal from recording head control section 40.

A light emission control is conducted so that a unit time in which a drive signal becomes active is 0.3 μsec for blue, 0.3 μsec for green and 0.1 sec for red for each time. Accordingly, in the case of 256 levels in gradation, enable signals are generated 256 times so as to depict the gradation. With this method, a wedge density characteristics of magenta coloring by a green exposure, a wedge of magenta coloring by a red exposure and a wedge density characteristics of yellow coloring by a blue exposure are obtained as same as above.

Figure 10:
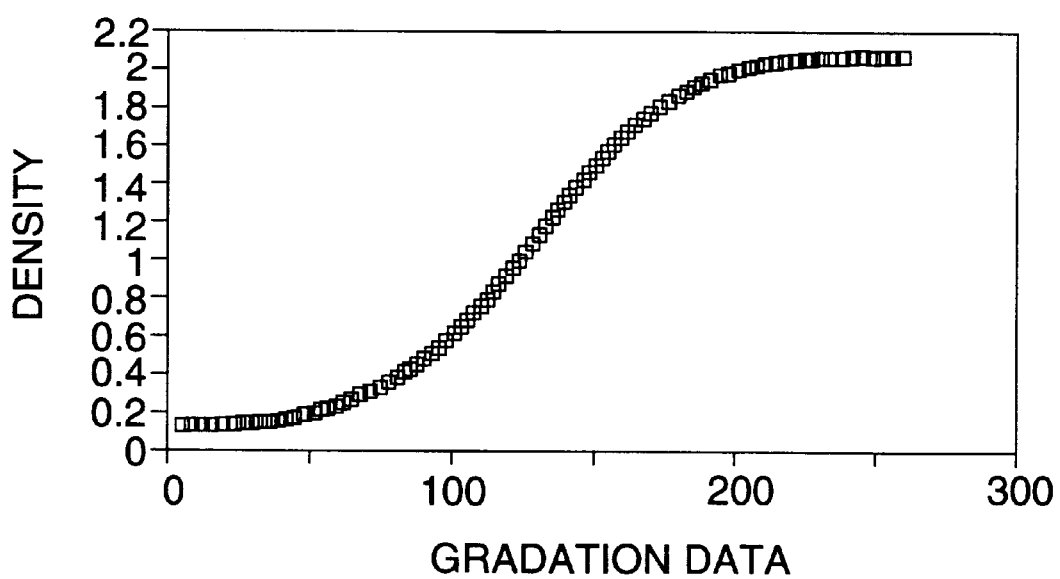
FIG. 10 is a view showing density characteristics of the embodiment of the present invention.

Further, in cases that a generating period of the enable signal is changed for each color in accordance with a count value of the "n" order counter in the manner indicated below, the gradation levels in the low density become continuous. As a result, test results in which smooth continuous gradation can be reproduced as indicated with the wedge density characteristics of magenta coloring by green exposure in shown in FIG. 10 was obtained.

| Counter value | Period |
|---|---|
| For green | |
| 0 | $1 \times 14.5$ μs |
| 1 | $(10^{0.01} - 1) \times 14.5$ μs |
| 2 | $(10^{0.02} - 10^{0.01}) \times 14.5$ μs |
| 3 | $(10^{0.03} - 10^{0.02}) \times 14.5$ μs |
| — | — |
| i | $(10^{0.01i} - 10^{0.01(i-1)}) \times 14.5$ μs |
| — | — |
| 255 | $(10^{2.55} - 10^{2.54}) \times 14.5$ μs |
| For blue | |
| 0 | $1 \times 8.7$ μs |
| 1 | $(10^{0.01} - 1) \times 8.7$ μs |
| 2 | $(10^{0.02} - 10^{0.01}) \times 8.7$ μs |
| 3 | $(10^{0.03} - 10^{0.02}) \times 8.7$ μs |
| — | — |
| i | $(10^{0.01i} - 10^{0.01(i-1)}) \times 8.7$ μs |
| — | — |
| 255 | $(10^{2.55} - 10^{2.54}) \times 8.7$ μs |
| For red | |
| 0 | $1 \times 29$ μs |
| 1 | $(10^{0.01} - 1) \times 29$ μs |
| 2 | $(10^{0.02} - 10^{0.01}) \times 29$ μs |
| 3 | $(10^{0.03} - 10^{0.02}) \times 29$ μs |
| — | — |
| i | $(10^{0.01i} - 10^{0.01(i-1)}) \times 29$ μs |
| — | — |
| 255 | $(10^{2.55} - 10^{2.54}) \times 29$ μs |

Incidentally, with regard to the cyan wedge by the red exposure and the yellow wedge by the blue exposure, the same test results were obtained. As mentioned above, according to the present embodiment, since the width of the enable signal can be freely changed, the gradation can be adjusted in accordance with the output characteristics of the apparatus and the characteristics of the photosensitive material.

Figure 18:
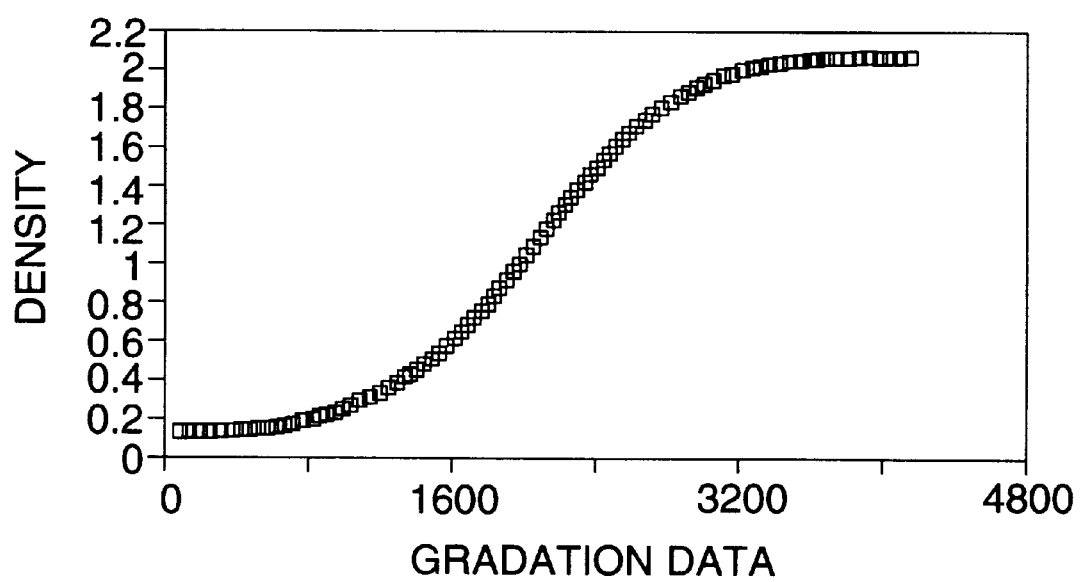
FIG. 18 is a graph showing a wedge density characteristics of magenta coloring by green exposure.

In the case that a generating period of an enable signal was changed for the count value of n-order counter with regard to each of green, blue and red as shown in Table 5, gradation level in a low density region became continuous. As a result, an experiment result reproducing a smooth continuous gradation could be obtained as shown by the wedge density characteristics of magenta coloring by a green exposure shown in FIG. 18.

TABLE 5

| Count value of n-order counter | Enable signal generating period (μs) | | |
|---|---|---|---|
| | Green | Blue | Red |
| 0 | $1 \times 2.0$ | $1 \times 2.0$ | $1 \times 1.0$ |
| 1 | $(10^{0.01} - 1) \times 2.0$ | $(10^{0.01} - 1) \times 2.0$ | $(10^{0.01} - 1) \times 1.0$ |
| 2 | $(10^{0.02} - 10^{0.01}) \times 2.0$ | $(10^{0.02} - 10^{0.01}) \times 2.0$ | $(10^{0.02} - 10^{0.01}) \times 1.0$ |
| 3 | $(10^{0.03} - 10^{0.02}) \times 2.0$ | $(10^{0.03} - 10^{0.02}) \times 2.0$ | $(10^{0.03} - 10^{0.02}) \times 1.0$ |
| i | $(10^{0.01i} - 10^{0.01(i-1)}) \times 2.0$ | $(10^{0.01i} - 10^{0.01(i-1)}) \times 2.0$ | $(10^{0.01i} - 10^{0.01(i-1)}) \times 1.0$ |
| 255 | $(10^{2.55} - 10^{2.54}) \times 2.0$ | $(10^{2.55} - 10^{2.54}) \times 2.0$ | $(10^{2.55} - 10^{2.54}) \times 1.0$ |

Incidentally, the same results were obtained in a wedge of cyan coloring by a red exposure, a wedge of yellow coloring by a blue exposure.

In the above embodiment, a LED recording head and a VFPH recording head were used. However, a head for exposure is not limited to these heads. The similar effect may be obtained by a recording head which comprises a plurality of recording elements and can turn each recording element On or Off independently of others, such as a PLZ recording head using an appropriate back light, a light shutter array like a liquid shutter array recording head, and a laser array recording head in which semiconductor laser are arranged in an array form.

In the above embodiment, an image is formed by moving a light sensitive material for recording elements. However, it may be possible to form an image by moving recording elements for a light sensitive material.

Figure 19:
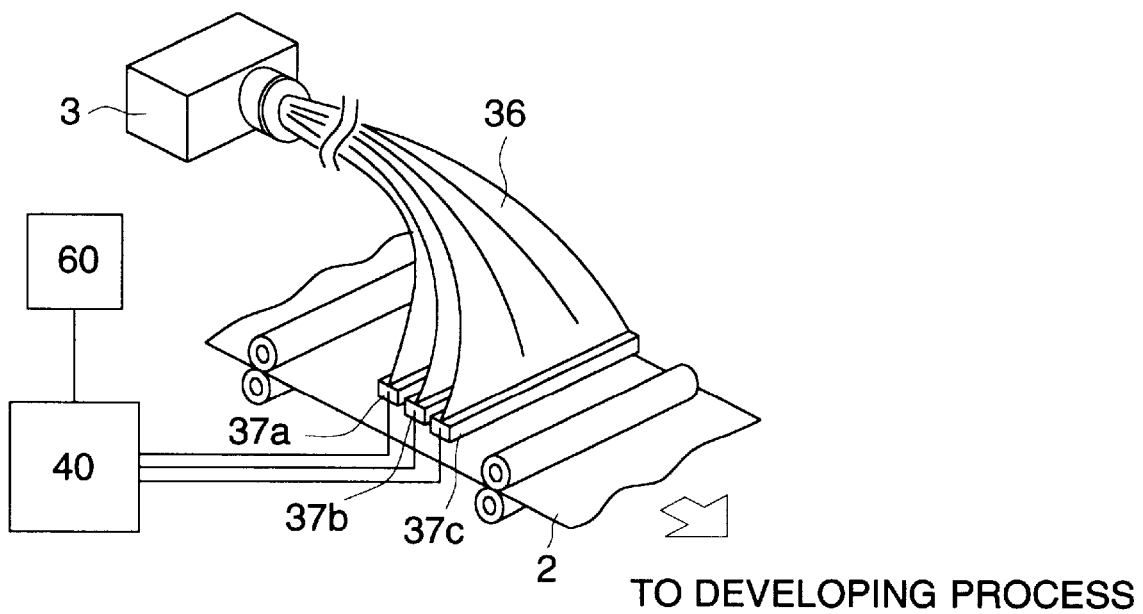
FIG. 19 is a view showing a outlined structure of an image forming apparatus in another example of the present invention.

In an image forming apparatus shown in FIG. 19, light emitted from a single light source 3 switched On during an image formation is divided by optical fibers 36, introduced into PLZT recording heads 37a, 37b and 37c equipped with a color filter, and used by recording heads 37a, 37b and 37c so as to expose a photographic paper 2 of a silver halide light sensitive material conveyed by nipping conveyance rollers in the same way as red, green and blue recording heads 38a, 38b and 38c shown in FIG. 1 so that the same result can be obtained.

Figure 20:
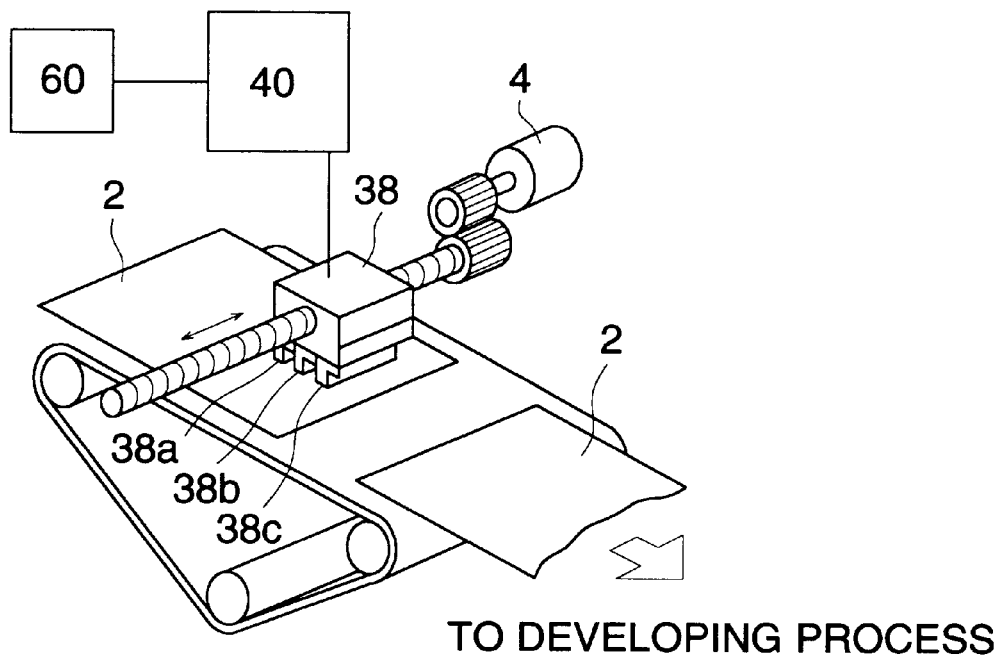
FIG. 20 is a view showing a outlined structure of an image forming apparatus in another example of the present invention.

Further, in an image forming apparatus shown in FIG. 20, a head carrier 38 on which a small width recording head of red 38a, 38b and 38c are mounted is shifted in a width direction by a conveying screw 5 driven by a motor 4, thereby conducting exposure overall a photographic paper having a large width with the small width recording head 38a, 38b and 38c so that the same high quality image formation as the image forming apparatus shown in FIGS. 1 and 19 can be conducted.

Figure 21:
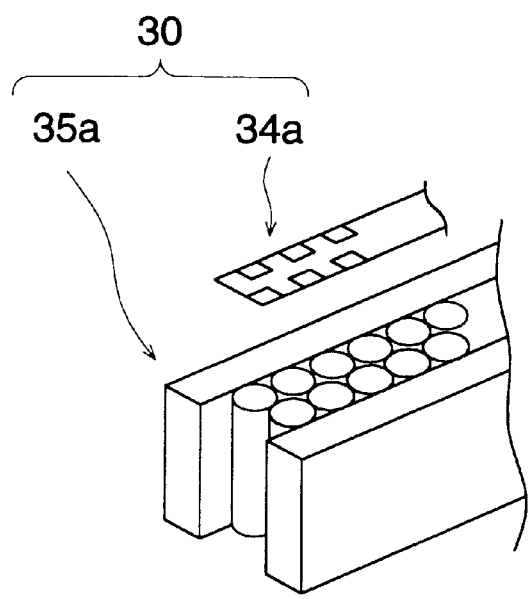
FIG. 21 is a view showing a outlined structure of a recording head in another example of the present invention.
Figure 22:
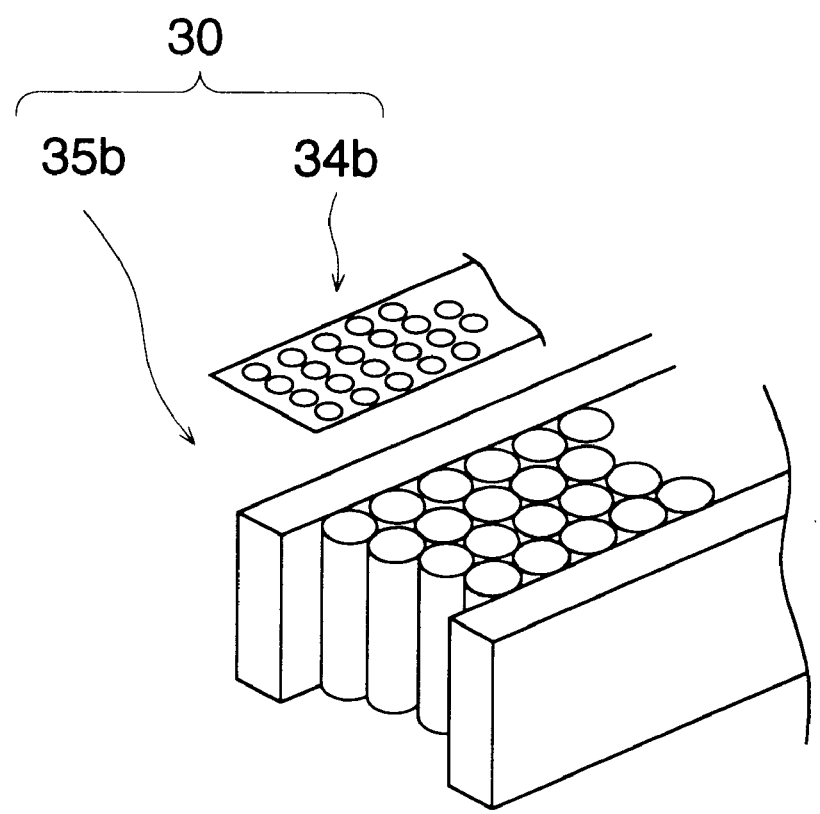
FIG. 22 is a view showing a outlined structure of a recording head in another example of the present invention.

A recording head 30 shown in FIG. 21 is composed of a recording element array 34a in which recording elements are arranged alternately in staggered two lines and a Selfoc lens array 35a for focusing light emitted from each recording element as an image on a silver halide light sensitive material. A recording head 30 shown in FIG. 22 is composed of a recording element array 34b in which recording elements are arranged in panel-shaped four lines and a Selfoc lens array 35b for focusing light emitted from each recording element as an image on a silver halide light sensitive material. By using these recording heads 30, an image formation can be conducted at a higher speed than the recording head 30 shown in FIG. 6.

Further, in the time period necessary from the start of the light emission to the end of the light emission for one line during which the exposure was conducted while the shift and stop of the printing paper was repeated, the test was conducted by changing the ratio "$r_t$" of the time period of the shift was changed to 50% and 30% . In the time of "$r_t$"=30% , an irregularity was observed in the image. On the other hand, in the time of "$r_t$"=50% , the density in each pixel region was unified, no irregularity was observed, and further, the density, in each pixel region did not become the saturated density from the low image density level. Accordingly, test results that the responding ability for the gradation was improved so as to attain good gradation was obtained.

As explained above, with Methods 1 and 2 and Structures 1 and 2, on the condition that a plurality of recording elements are driven and that the recording condition is close to an actual image recording condition, a light amount is obtained and correction is conducted, whereby density unevenness caused by the deviation in the light emission characteristics of each recording element can be reduced, a high resolution continuous gradation image can be obtained and a high quality image can be formed, without resulting in a complicated expensive apparatus.

In the invention, since density measurement values can be handled as light amount data on condition equal to the condition that the recording elements are driven so as to actually output an image, a far better image without the density unevenness can be obtained. In the invention, since the relationship between the light emission time and the density in the case of plural time exposures in which the exposure is conducted plural times is obtained and the correction is conducted based on the relationship, the density unevenness caused by the discontinuity in the relationship between the light emission time and the density can be eliminated more precisely and a far better image with less density unevenness can be obtained.

In the invention, since the light amount data are obtained directly on the actual image recording condition, the control can be simplified. In addition, density unevenness can be reduced so that the high image quality can be obtained.

In the invention, by using the measurement value of a single element together, a small density unevenness for each pixel can be reduced in addition to the unevenness of a large pitch, so that a high quality image can be obtained.

In the invention, since light measurement for a single element is conducted on condition that plural recording elements are emitting light, a correction value can be calculated far more precisely, so that a high quality image can be obtained.

In the invention, the driving means conducts the driving for the On-Off recording plural times for the silver halide photosensitive material in accordance with the time period of the enable signal. Accordingly, continuous gradation recording can be conducted so that a high quality image can be obtained without causing the apparatus to be complicated and a high cost.

In the invention, since the enable signal for each color can be set to conform with the sensitivity and the gradation characteristics of each photosensitive layer of the silver halide color photosensitive material, a continuous gradation image with a high resolution can be recorded on the silver halide color photosensitive material with the utilization of the characteristics of the silver halide photosensitive material without causing the apparatus to be complicated and a high cost.

Further, with the effect of the intermittent exposure effect which is the characteristics of the silver halide color photosensitive material, the difference between the high and low sensitivities becomes large and the color cross talk can be reduced so that color separation can be improved. In, addition, the spread of dots can be further widened so that the density of each dot region can be unified. As a result, a continuous gradation recording can be conducted so that a high quality image can be obtained without causing the apparatus to be complicated and a high cost for the purpose of positional registration for each color.

In the invention, since the plurality of recording elements arranged in an array form of a single line or plural lines is composed of a light emitting member comprising an LED array, a vacuum fluorescent tube array or a liquid shutter array, the discontinuity of the gradation can be reduced.

As mentioned before, the silver chloride photosensitive material tends to cause the density unevenness greatly due to the influence of the multi-exposure effect by the plural time exposures or the intermittent exposure effect.

However, in the invention, since the density unevenness is improved appreciably, the effect of the present invention for the silver chloride photosensitivity material is greater and the developing process can be conducted at a high speed.

In the invention, the enable signal corresponding to the density value of the image data can be set without causing the apparatus to be complicated at high cost.

In the invention, since the time period of the enable signal can be adjusted respectively by increasing or decreasing "t", the smooth gradation recording can be conducted.

In the invention, the apparatus can be simplified and the similar gradation recording can be realized by the simpler structure.

In the invention, since the time period of the enable signal can be adjusted finely, the gradation characteristics can be adjusted in accordance with the output characteristics of the apparatus.

Further, in the invention, more continuous gradation characteristics can be obtained.

In the invention, the gradation characteristics can be controlled with the time period of the enable signal. In addition, in cases where the exposure is conducted while the shifting is conducted, the unevenness recording caused in accordance with the spread of dot in the time of area modulation can be reduced.

In the invention, since the exposure is conducted while the shifting is conducted, the density in the dot region can be unified and the responding ability in the gradation control can be improved.

What is claimed is:

1. An apparatus for forming on silver halide photographic material an image having a plurality of pixels, the apparatus comprising:

a recording head including recording elements aligned in at least a single row;

driving means for receiving an image signal representing a density level for each pixel of the image and for driving each of the recording elements independently so as to emit intermittently plural light emissions for each pixel of the image depending on the image signal;

means for obtaining light amount data corresponding to a total light amount of plural light emissions emitted intermittently so as to form a single pixel for each of the recording elements driven by the driving means, the light amount data of each of the recording elements being obtained according to a condition when plural recording elements of the recording elements are simultaneously driven by the driving means;

means for obtaining a correction value for each of the recording elements according to the light amount data;

correcting means for correcting a light amount of each of the recording elements with the correction value; and conveying means for relatively conveying the silver halide photographic material to the recording elements so that the silver halide photographic material is exposed by the plural light emissions emitted intermittently from each of the recording elements for each pixel of the image in accordance with density level of the image signal.

2. The apparatus of claim 1, wherein the means for obtaining light amount data obtains the light amount data by measuring a density of the photographic material exposed by the recording elements.

3. The apparatus of claim 3, wherein the means for obtaining the light amount data converts density data of each of the recording elements into the light amount data by a relation between the density data and the light amount data, wherein the means for obtaining the correction value obtains the correction value of the light amount of each of the recording elements from the light amount data, and wherein the correcting means corrects the light amount of each of the recording elements with the correction value.

4. The apparatus of claim 1, wherein the driving means drives the plural recording elements of the recording elements simultaneously so as to emit lights, and wherein the means for obtaining the light amount data obtains the light amount data in accordance with a total light amount of the plural recording elements of the recording elements.

5. The apparatus of claim 4, wherein a single light amount of each of the recording elements is obtained according to a condition when the recording elements are driven one by one by the driving means, and wherein the means for obtaining the correction value obtains the correction value according to both the light amount data and the single light amount.

6. The apparatus of claim 4, wherein the light amount data is obtained by measuring a light amount of each of the recording elements.

7. The apparatus of claim 1, wherein the driving means comprises latch means for latching the image data for each line of pixels of the image, enable signal generating means for generating an enable signal for every time when the image data is latched by the latch means, wherein the enable signal is converted into a combination of one of same time width and different time widths in accordance with the image data, and a driving member for driving each of the recording elements respectively based on the enable signal generated by the enable signal generating means so as to conduct On-Off exposure plural times in accordance with the time width of the enable signal generated by the enable signal generating means.

8. The apparatus of claim 7, wherein the driving member conducts the On-Off exposure plural times in accordance with the enable signal generated by the enable signal generating means so that a length of a total recording time period of each of the recording elements set by the enable signal generated by the enable signal generating means corresponds to a gradation of the image data, and wherein the apparatus further comprises a plurality of recording heads, each of the recording heads being controlled so as to emit each color light of a plurality of color light corresponding to a plurality of photosensitive layers on the silver halide photographic material which differ in color-sensitivity.

9. The apparatus of claim 8, wherein each of the plurality of recording heads is composed of at least one of a LED array, a vacuum fluorescent tube array and a liquid crystal shutter array.

10. The apparatus of claim 7, wherein each time width corresponds to a gradation of the image data, each time width being a multi-valued digital value wherein each bit is represented by a binary number having a weight, the enable signal generating means changing each time width sequentially in accordance with the weight of each bit and the driving member driving each of the recording elements individually so as to conduct the On-Off exposure.

11. The apparatus of claim 7, wherein the driving member drives each of the recording elements individually so as to conduct the On-Off exposure with each time width of $2^n T+t$ of the enable signal generated by the enable signal generating means, wherein "n" is either 0, 1, 2, . . . which is a bit number in the time that each time width of the enable signal generated by the enable signal generating means is converted in a digital value in accordance with a gradation of the image data, "T" is a unit time, and "t" is one of a negative and positive predetermined time.

12. The apparatus of claim 7, wherein the enable signal generating means generates a plurality of enable signals each having a constant time width, the driving member driving each of the recording elements individually so as to conduct the On-Off exposure by a number of times of the value of the image data.

13. The apparatus of claim 12, wherein the enable signal generating means changeably sets a constant time width of each of the enable signals generated separately by the enable signal generating means.

14. The apparatus of claim 7, wherein the recording elements are aligned in a single row or plural rows in an aligned direction, and wherein a ratio of an exposure size of a single recording element of the recording elements in the aligned direction to a recording pitch in the aligned direction is 0.7 to 1.2.

15. The apparatus of claim 14, wherein a ratio of an exposure size of the single recording element in a vertical direction vertical to the aligned direction to a recording pitch in the vertical direction is 0.3 to 1.0.

16. The apparatus of claim 14, wherein the exposure size of the single recording element in a vertical direction vertical to the aligned direction is defined as "A", a recording pitch in the vertical direction is defined as "B", and a ratio of a time period from start of light emission to completion of the light emission for a single line to a recording time cycle for the single line is defined as "C", and wherein recording is conducted so as to satisfy the following formula:

$$0.8 \leq (A/B+C) \leq 1.3.$$

17. The apparatus of claim 7, wherein when gradation recording is conducted in stages, the enable signal generating means generating the enable signal so that an interval time period between each enable signal in which the enable signal is in a rest condition is set not less than 2 micro seconds.

18. The apparatus of claim 7, further comprising shift control means for conducting a shift control of the conveying means so that shift and stop of the silver halide photographic material is repeated in a vertical direction vertical to an aligned direction of the recording elements, and wherein recording is conducted by using exposure not less than 50% of the time period from start of exposure to completion of the exposure of the recording elements for a single line while the silver halide photographic material is shifting based on the shift control by the shift control means.

19. The apparatus of claim 1,
wherein the driving means drives each of the recording elements with a plurality of On signals in accordance with a density level of each pixel of the image so as to conduct On-Off driving plural times for each pixel of the image so that the silver halide photographic material is exposed with 512 gradation levels or more.

20. The apparatus of claim 19, wherein the plurality of On signals have identical On-time width.

21. The apparatus of claim 19, wherein the plurality of On signals have different On-time widths.

22. The apparatus of claim 19, wherein the gradation levels are not more than 65536.

23. The apparatus of claim 19, wherein the correcting means corrects deviation in light amount for each of the recording elements with the correction value.

24. The apparatus of claim 19, wherein the silver halide photographic material has a plurality of light sensitive layers differing in sensitive color and the recording elements are controlled independently to emit a plurality of color light corresponding to the plurality of light sensitive layers and wherein the recording elements emit at least green color light and are controlled to form 512 gradation levels or more in accordance with the plurality of On signals.

* * * * *